US011483609B2

(12) United States Patent
Amidei et al.

(10) Patent No.: US 11,483,609 B2
(45) Date of Patent: *Oct. 25, 2022

(54) SYSTEMS AND METHODS FOR ENCODING VIDEO CONTENT

(71) Applicant: DIVX, LLC, San Diego, CA (US)

(72) Inventors: William David Amidei, San Diego, CA (US); Abhishek Shivadas, San Diego, CA (US); Kevin Dean-Yong Wu, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/343,453

(22) Filed: Jun. 9, 2021

(65) Prior Publication Data

US 2022/0021919 A1 Jan. 20, 2022

Related U.S. Application Data

(63) Continuation of application No. 16/819,865, filed on Mar. 16, 2020, now Pat. No. 11,064,235, which is a
(Continued)

(51) Int. Cl.
*H04N 21/2662* (2011.01)
*H04N 21/2343* (2011.01)
(Continued)

(52) U.S. Cl.
CPC ....... *H04N 21/2662* (2013.01); *H04L 65/613* (2022.05); *H04L 65/70* (2022.05);
(Continued)

(58) Field of Classification Search
CPC ........... H04N 21/2662; H04N 21/2343; H04N 21/2625; H04N 21/6379; H04N 21/8456;
(Continued)

(56) References Cited

U.S. PATENT DOCUMENTS 3,919,474 A 11/1975 Benson
4,009,331 A 2/1977 Goldmark et al.
(Continued)

FOREIGN PATENT DOCUMENTS

AU 2010202963 A1 2/2012
CA 2237293 A1 7/1997
(Continued)

OTHER PUBLICATIONS

Broadq—The Ultimate Home Entertainment Software, printed May 11, 2009 from http://web.srchive.org/web/20030401122010/www.broadq.com/qcasttuner/, 1 pg.
(Continued)

*Primary Examiner* — Sargon N Nano
(74) *Attorney, Agent, or Firm* — KPPB LLP

(57) ABSTRACT

Systems and methods for encoding a plurality of alternative streams of video content using multiple encoders in accordance with embodiments of the invention are disclosed. An encoding system includes multiple encoders. Each of the encoders receives a source stream of video content that is divided into portions. Each of the encoders generates portions of the plurality of alternative streams from the portions of the source stream. The portions of the alternative streams generated by a particular encoder are stored in a container for the particular encoder. Each encoder also generates index information for the portion of the alternative stream generated by the encoder that is stored in a manifest for the encoder.

18 Claims, 7 Drawing Sheets

Related U.S. Application Data continuation of application No. 16/208,210, filed on Dec. 3, 2018, now Pat. No. 10,595,070, which is a continuation of application No. 15/183,562, filed on Jun. 15, 2016, now Pat. No. 10,148,989.

(51) Int. Cl.

| | | |
|---|---|---|
| *H04N 21/6379* | (2011.01) | |
| *H04N 21/262* | (2011.01) | |
| *H04N 21/845* | (2011.01) | |
| *H04L 65/70* | (2022.01) | |
| *H04L 65/613* | (2022.01) | |
| *H04L 65/75* | (2022.01) | |
| *H04L 65/65* | (2022.01) | |
| *H04L 67/02* | (2022.01) | |
| *H04N 21/61* | (2011.01) | |

(52) U.S. Cl.
CPC ..... *H04L 65/762* (2022.05); *H04N 21/23439* (2013.01); *H04N 21/26258* (2013.01); *H04N 21/6379* (2013.01); *H04N 21/8456* (2013.01); *H04L 65/65* (2022.05); *H04L 67/02* (2013.01); *H04N 21/234363* (2013.01); *H04N 21/234372* (2013.01); *H04N 21/234381* (2013.01); *H04N 21/6125* (2013.01)

(58) Field of Classification Search
CPC ............. H04N 21/2658; H04N 21/637; H04N 21/234363; H04N 21/234381; H04N 21/234372; H04N 21/6125; H04L 65/4092; H04L 65/602; H04L 65/607; H04L 65/70; H04L 65/613; H04L 65/65; H04L 67/02
See application file for complete search history.

(56) References Cited

U.S. PATENT DOCUMENTS

| | | |
|---|---|---|
| 4,694,357 A | 9/1987 | Rahman et al. |
| 4,802,170 A | 1/1989 | Trottier |
| 4,964,069 A | 10/1990 | Ely |
| 4,974,260 A | 11/1990 | Rudak |
| 5,119,474 A | 6/1992 | Beitel et al. |
| 5,274,758 A | 12/1993 | Beitel et al. |
| 5,361,332 A | 11/1994 | Yoshida et al. |
| 5,396,497 A | 3/1995 | Veltman |
| 5,400,401 A | 3/1995 | Wasilewski et al. |
| 5,404,436 A | 4/1995 | Hamilton |
| 5,420,801 A | 5/1995 | Dockter et al. |
| 5,420,974 A | 5/1995 | Morris et al. |
| 5,471,576 A | 11/1995 | Yee |
| 5,477,272 A | 12/1995 | Zhang et al. |
| 5,487,167 A | 1/1996 | Dinallo et al. |
| 5,533,021 A | 7/1996 | Branstad et al. |
| 5,537,408 A | 7/1996 | Branstad et al. |
| 5,539,908 A | 7/1996 | Chen et al. |
| 5,541,662 A | 7/1996 | Adams et al. |
| 5,574,785 A | 11/1996 | Ueno et al. |
| 5,583,652 A | 12/1996 | Ware |
| 5,600,721 A | 2/1997 | Kitazato |
| 5,621,794 A | 4/1997 | Matsuda et al. |
| 5,627,936 A | 5/1997 | Prasad |
| 5,633,472 A | 5/1997 | DeWitt et al. |
| 5,642,171 A | 6/1997 | Baumgartner et al. |
| 5,642,338 A | 6/1997 | Fukushima et al. |
| 5,655,117 A | 8/1997 | Goldberg et al. |
| 5,664,044 A | 9/1997 | Ware |
| 5,675,382 A | 10/1997 | Bauchspies |
| 5,675,511 A | 10/1997 | Prasad et al. |
| 5,684,542 A | 11/1997 | Tsukagoshi |
| 5,717,394 A | 2/1998 | Schwartz et al. |
| 5,719,786 A | 2/1998 | Nelson et al. |
| 5,745,643 A | 4/1998 | Mishina |
| 5,751,280 A | 5/1998 | Abbott |
| 5,763,800 A | 6/1998 | Rossum et al. |
| 5,765,164 A | 6/1998 | Prasad et al. |
| 5,794,018 A | 8/1998 | Vrvilo et al. |
| 5,805,228 A | 9/1998 | Proctor et al. |
| 5,805,700 A | 9/1998 | Nardone et al. |
| 5,813,010 A | 9/1998 | Kurano et al. |
| 5,822,524 A | 10/1998 | Chen et al. |
| 5,828,370 A | 10/1998 | Moeller et al. |
| 5,844,575 A | 12/1998 | Reid |
| 5,848,217 A | 12/1998 | Tsukagoshi et al. |
| 5,854,873 A | 12/1998 | Mori et al. |
| 5,903,261 A | 5/1999 | Walsh et al. |
| 5,907,597 A | 5/1999 | Mark |
| 5,907,658 A | 5/1999 | Murase et al. |
| 5,912,710 A | 6/1999 | Fujimoto |
| 5,923,869 A | 7/1999 | Kashiwagi et al. |
| 5,956,729 A | 9/1999 | Goetz et al. |
| 5,959,690 A | 9/1999 | Toebes, VIII et al. |
| 5,990,955 A | 11/1999 | Koz |
| 6,002,834 A | 12/1999 | Hirabayashi et al. |
| 6,005,621 A | 12/1999 | Linzer et al. |
| 6,009,237 A | 12/1999 | Hirabayashi et al. |
| 6,016,381 A | 1/2000 | Taira et al. |
| 6,031,622 A | 2/2000 | Ristow et al. |
| 6,046,778 A | 4/2000 | Nonomura et al. |
| 6,057,832 A | 5/2000 | Lev et al. |
| 6,065,050 A | 5/2000 | DeMoney |
| 6,079,566 A | 6/2000 | Eleftheriadis et al. |
| 6,157,410 A | 12/2000 | Izumi et al. |
| 6,169,242 B1 | 1/2001 | Fay et al. |
| 6,192,154 B1 | 2/2001 | Rajagopalan et al. |
| 6,195,388 B1 | 2/2001 | Choi et al. |
| 6,204,883 B1 | 3/2001 | Tsukagoshi |
| 6,246,803 B1 | 6/2001 | Gauch et al. |
| 6,266,483 B1 | 7/2001 | Okada et al. |
| 6,282,320 B1 | 8/2001 | Hasegawa et al. |
| 6,308,005 B1 | 10/2001 | Ando et al. |
| 6,320,905 B1 | 11/2001 | Konstantinides |
| 6,330,286 B1 | 12/2001 | Lyons et al. |
| 6,351,538 B1 | 2/2002 | Uz |
| 6,373,803 B2 | 4/2002 | Ando et al. |
| 6,374,144 B1 | 4/2002 | Viviani et al. |
| 6,395,969 B1 | 5/2002 | Fuhrer |
| 6,415,031 B1 | 7/2002 | Colligan et al. |
| 6,430,354 B1 | 8/2002 | Watanabe |
| 6,445,877 B1 | 9/2002 | Okada et al. |
| 6,453,115 B1 | 9/2002 | Boyle |
| 6,453,116 B1 | 9/2002 | Ando et al. |
| 6,481,012 B1 | 11/2002 | Gordon et al. |
| 6,504,873 B1 | 1/2003 | Vehvilaeinen |
| 6,512,883 B2 | 1/2003 | Shim et al. |
| 6,594,699 B1 | 7/2003 | Sahai et al. |
| 6,614,843 B1 | 9/2003 | Gordon et al. |
| 6,654,933 B1 | 11/2003 | Abbott et al. |
| 6,658,056 B1 | 12/2003 | Duruöz et al. |
| 6,665,835 B1 | 12/2003 | Gutfreund et al. |
| 6,671,408 B1 | 12/2003 | Kaku |
| 6,690,838 B2 | 2/2004 | Zhou |
| 6,697,568 B1 | 2/2004 | Kaku |
| 6,724,944 B1 | 4/2004 | Kalevo et al. |
| 6,725,281 B1 | 4/2004 | Zintel et al. |
| 6,751,623 B1 | 6/2004 | Basso et al. |
| 6,807,306 B1 | 10/2004 | Girgensohn et al. |
| 6,813,437 B2 | 11/2004 | Ando et al. |
| 6,819,394 B1 | 11/2004 | Nomura et al. |
| 6,856,997 B2 | 2/2005 | Lee et al. |
| 6,859,496 B1 | 2/2005 | Boroczky et al. |
| 6,871,006 B1 | 3/2005 | Oguz et al. |
| 6,912,513 B1 | 6/2005 | Candelore |
| 6,917,652 B2 | 7/2005 | Lyu |
| 6,920,179 B1 | 7/2005 | Anand et al. |
| 6,931,531 B1 | 8/2005 | Takahashi |
| 6,944,621 B1 | 9/2005 | Collart |
| 6,944,629 B1 | 9/2005 | Shioi et al. |
| 6,956,901 B2 | 10/2005 | Boroczky et al. |
| 6,957,350 B1 | 10/2005 | Demos |
| 6,970,564 B1 | 11/2005 | Kubota et al. |

(56) References Cited

U.S. PATENT DOCUMENTS

| | | |
|---|---|---|
| 6,983,079 B2 | 1/2006 | Kim |
| 6,985,588 B1 | 1/2006 | Glick et al. |
| 6,988,144 B1 | 1/2006 | Luken et al. |
| 7,006,757 B2 | 2/2006 | Ando et al. |
| 7,007,170 B2 | 2/2006 | Morten |
| 7,020,287 B2 | 3/2006 | Unger |
| 7,127,155 B2 | 10/2006 | Ando et al. |
| 7,151,832 B1 | 12/2006 | Fetkovich et al. |
| 7,188,183 B1 | 3/2007 | Paul et al. |
| 7,209,892 B1 | 4/2007 | Galuten et al. |
| 7,212,726 B2 | 5/2007 | Zetts |
| 7,237,061 B1 | 6/2007 | Boic |
| 7,242,772 B1 | 7/2007 | Tehranchi |
| 7,274,861 B2 | 9/2007 | Yahata et al. |
| 7,295,673 B2 | 11/2007 | Grab et al. |
| 7,330,875 B1 | 2/2008 | Parasnis et al. |
| 7,340,528 B2 | 3/2008 | Noblecourt et al. |
| 7,349,886 B2 | 3/2008 | Morten et al. |
| 7,352,956 B1 | 4/2008 | Winter et al. |
| 7,356,245 B2 | 4/2008 | Belknap et al. |
| 7,366,788 B2 | 4/2008 | Jones et al. |
| 7,382,879 B1 | 6/2008 | Miller |
| 7,397,853 B2 | 7/2008 | Kwon et al. |
| 7,400,679 B2 | 7/2008 | Kwon et al. |
| 7,418,132 B2 | 8/2008 | Hoshuyama |
| 7,457,359 B2 | 11/2008 | Mabey et al. |
| 7,457,415 B2 | 11/2008 | Reitmeier et al. |
| 7,478,325 B2 | 1/2009 | Foehr |
| 7,493,018 B2 | 2/2009 | Kim |
| 7,499,930 B2 | 3/2009 | Naka et al. |
| 7,499,938 B2 | 3/2009 | Collart |
| 7,546,641 B2 | 6/2009 | Robert et al. |
| 7,639,921 B2 | 12/2009 | Seo et al. |
| 7,640,435 B2 | 12/2009 | Morten |
| 7,711,052 B2 | 5/2010 | Hannuksela et al. |
| 7,728,878 B2 | 6/2010 | Yea et al. |
| 7,853,980 B2 | 12/2010 | Pedlow, Jr. et al. |
| 7,864,186 B2 | 1/2011 | Robotham et al. |
| 7,869,691 B2 | 1/2011 | Kelly et al. |
| 7,945,143 B2 | 5/2011 | Yahata et al. |
| 8,023,562 B2 | 9/2011 | Zheludkov et al. |
| 8,046,453 B2 | 10/2011 | Olaiya |
| 8,054,880 B2 | 11/2011 | Yu et al. |
| 8,131,875 B1 | 3/2012 | Chen |
| 8,169,916 B1 | 5/2012 | Pai et al. |
| 8,225,061 B2 | 7/2012 | Greenebaum |
| 8,233,768 B2 | 7/2012 | Soroushian et al. |
| 8,243,924 B2 | 8/2012 | Chen et al. |
| 8,249,168 B2 | 8/2012 | Graves |
| 8,270,473 B2 | 9/2012 | Chen et al. |
| 8,270,819 B2 | 9/2012 | Vannier |
| 8,286,213 B2 | 10/2012 | Seo |
| 8,289,338 B2 | 10/2012 | Priyadarshi et al. |
| 8,311,115 B2 | 11/2012 | Gu et al. |
| 8,312,079 B2 | 11/2012 | Newsome et al. |
| 8,321,556 B1 | 11/2012 | Chatterjee et al. |
| 8,369,421 B2 | 2/2013 | Kadono et al. |
| 8,386,621 B2 | 2/2013 | Park |
| 8,456,380 B2 | 6/2013 | Pagan |
| 8,472,792 B2 | 6/2013 | Butt et al. |
| 8,649,669 B2 | 2/2014 | Braness et al. |
| 8,683,066 B2 | 3/2014 | Hurst et al. |
| 8,689,267 B2 * | 4/2014 | Hunt .................. H04N 21/8456 725/86 |
| 8,751,679 B2 * | 6/2014 | McHugh .......... H04N 21/47202 709/219 |
| RE45,052 E | 7/2014 | Li |
| 8,768,984 B2 | 7/2014 | Priddle et al. |
| 8,782,268 B2 | 7/2014 | Pyle et al. |
| 8,818,171 B2 | 8/2014 | Soroushian et al. |
| 8,819,116 B1 | 8/2014 | Tomay et al. |
| 8,832,297 B2 | 9/2014 | Soroushian et al. |
| 8,849,950 B2 | 9/2014 | Stockhammer et al. |
| 8,914,534 B2 | 12/2014 | Braness et al. |
| 8,924,580 B2 * | 12/2014 | Begen .................. H04N 19/154 709/219 |
| 8,948,249 B2 * | 2/2015 | Sun ..................... H04N 21/8456 375/240.01 |
| 9,021,119 B2 | 4/2015 | Van Der Schaar et al. |
| 9,025,659 B2 | 5/2015 | Soroushian et al. |
| 9,038,116 B1 | 5/2015 | Knox et al. |
| 9,197,944 B2 * | 11/2015 | Reisner ............. H04N 21/8456 |
| 9,246,971 B2 * | 1/2016 | Giladi .................. H04L 65/612 |
| 9,350,990 B2 | 5/2016 | Orton-Jay et al. |
| 9,357,210 B2 | 5/2016 | Orton-Jay et al. |
| 9,374,604 B2 * | 6/2016 | Nemiroff ........... H04N 21/2335 |
| 9,467,708 B2 | 10/2016 | Soroushian et al. |
| 9,485,526 B2 * | 11/2016 | Hybertson ......... H04N 21/2365 |
| 9,510,031 B2 | 11/2016 | Soroushian et al. |
| 9,571,827 B2 | 2/2017 | Su et al. |
| 9,661,049 B2 | 5/2017 | Gordon |
| 9,668,007 B2 * | 5/2017 | Van Veldhuisen ... H04N 21/647 |
| 9,712,890 B2 | 7/2017 | Shivadas et al. |
| 9,955,195 B2 | 4/2018 | Soroushian |
| 10,148,989 B2 | 12/2018 | Amidei et al. |
| 10,452,715 B2 | 10/2019 | Soroushian et al. |
| 10,595,070 B2 | 3/2020 | Amidei et al. |
| 10,708,587 B2 | 7/2020 | Soroushian et al. |
| 11,064,235 B2 | 7/2021 | Amidei et al. |
| 2001/0021276 A1 | 9/2001 | Zhou |
| 2001/0030710 A1 | 10/2001 | Werner |
| 2001/0052077 A1 | 12/2001 | Fung et al. |
| 2001/0052127 A1 | 12/2001 | Seo et al. |
| 2002/0034252 A1 | 3/2002 | Owen et al. |
| 2002/0048450 A1 | 4/2002 | Zetts |
| 2002/0051494 A1 | 5/2002 | Yamaguchi et al. |
| 2002/0062313 A1 | 5/2002 | Lee et al. |
| 2002/0067432 A1 | 6/2002 | Kondo et al. |
| 2002/0076112 A1 | 6/2002 | Devara |
| 2002/0085638 A1 | 7/2002 | Morad et al. |
| 2002/0087569 A1 | 7/2002 | Fischer et al. |
| 2002/0091665 A1 | 7/2002 | Beek et al. |
| 2002/0093571 A1 | 7/2002 | Hyodo |
| 2002/0094031 A1 | 7/2002 | Ngai et al. |
| 2002/0110193 A1 | 8/2002 | Yoo et al. |
| 2002/0118953 A1 | 8/2002 | Kim |
| 2002/0120498 A1 | 8/2002 | Gordon et al. |
| 2002/0135607 A1 | 9/2002 | Kato et al. |
| 2002/0136298 A1 * | 9/2002 | Anantharamu ...... H04N 19/156 375/E7.198 |
| 2002/0141503 A1 | 10/2002 | Kobayashi et al. |
| 2002/0143413 A1 | 10/2002 | Fay et al. |
| 2002/0143547 A1 | 10/2002 | Fay et al. |
| 2002/0147980 A1 | 10/2002 | Satoda |
| 2002/0151992 A1 | 10/2002 | Hoffberg et al. |
| 2002/0154125 A1 * | 10/2002 | Coleman ............. H04N 21/854 345/473 |
| 2002/0154779 A1 | 10/2002 | Asano et al. |
| 2002/0161462 A1 | 10/2002 | Fay |
| 2002/0164024 A1 | 11/2002 | Arakawa et al. |
| 2002/0169971 A1 | 11/2002 | Asano et al. |
| 2002/0180929 A1 | 12/2002 | Tseng et al. |
| 2002/0184159 A1 | 12/2002 | Tadayon et al. |
| 2002/0191112 A1 | 12/2002 | Akiyoshi et al. |
| 2002/0191960 A1 | 12/2002 | Fujinami et al. |
| 2003/0001964 A1 | 1/2003 | Masukura et al. |
| 2003/0002577 A1 | 1/2003 | Pinder |
| 2003/0002578 A1 | 1/2003 | Tsukagoshi et al. |
| 2003/0005442 A1 | 1/2003 | Brodersen et al. |
| 2003/0012275 A1 | 1/2003 | Boice et al. |
| 2003/0035488 A1 | 2/2003 | Barrau |
| 2003/0044080 A1 | 3/2003 | Frishman et al. |
| 2003/0053541 A1 | 3/2003 | Sun et al. |
| 2003/0063675 A1 | 4/2003 | Kang et al. |
| 2003/0077071 A1 | 4/2003 | Lin et al. |
| 2003/0078930 A1 | 4/2003 | Surcouf et al. |
| 2003/0093799 A1 | 5/2003 | Kauffman et al. |
| 2003/0123855 A1 | 7/2003 | Okada et al. |
| 2003/0128296 A1 | 7/2003 | Lee |
| 2003/0133506 A1 | 7/2003 | Haneda |
| 2003/0135742 A1 | 7/2003 | Evans |
| 2003/0142594 A1 | 7/2003 | Tsumagari et al. |
| 2003/0142872 A1 | 7/2003 | Koyanagi |

(56) References Cited

U.S. PATENT DOCUMENTS

| | | |
|---|---|---|
| 2003/0152370 A1 | 8/2003 | Otomo et al. |
| 2003/0165328 A1 | 9/2003 | Grecia |
| 2003/0185302 A1 | 10/2003 | Abrams |
| 2003/0185542 A1 | 10/2003 | McVeigh et al. |
| 2003/0206558 A1 | 11/2003 | Parkkinen et al. |
| 2003/0206717 A1 | 11/2003 | Yogeshwar et al. |
| 2003/0216922 A1 | 11/2003 | Gonzales et al. |
| 2003/0231863 A1 | 12/2003 | Eerenberg et al. |
| 2003/0231867 A1 | 12/2003 | Gates et al. |
| 2003/0236836 A1 | 12/2003 | Borthwick |
| 2004/0001594 A1 | 1/2004 | Krishnaswamy et al. |
| 2004/0006701 A1 | 1/2004 | Kresina |
| 2004/0021684 A1 | 2/2004 | Millner |
| 2004/0022391 A1 | 2/2004 | Obrien |
| 2004/0025180 A1 | 2/2004 | Begeja et al. |
| 2004/0028227 A1 | 2/2004 | Yu |
| 2004/0037421 A1 | 2/2004 | Truman |
| 2004/0047592 A1 | 3/2004 | Seo et al. |
| 2004/0047607 A1 | 3/2004 | Seo et al. |
| 2004/0047614 A1 | 3/2004 | Green |
| 2004/0052501 A1 | 3/2004 | Tam |
| 2004/0062306 A1* | 4/2004 | Takahashi ............ H04N 19/177 375/240.01 |
| 2004/0071453 A1 | 4/2004 | Valderas |
| 2004/0076237 A1 | 4/2004 | Kadono et al. |
| 2004/0081333 A1 | 4/2004 | Grab et al. |
| 2004/0081434 A1 | 4/2004 | Jung et al. |
| 2004/0093494 A1 | 5/2004 | Nishimoto et al. |
| 2004/0101059 A1 | 5/2004 | Joch et al. |
| 2004/0107356 A1 | 6/2004 | Shamoon et al. |
| 2004/0114687 A1 | 6/2004 | Ferris et al. |
| 2004/0117347 A1 | 6/2004 | Seo et al. |
| 2004/0136698 A1 | 7/2004 | Mock |
| 2004/0143760 A1 | 7/2004 | Alkove et al. |
| 2004/0146276 A1 | 7/2004 | Ogawa |
| 2004/0150747 A1 | 8/2004 | Sita |
| 2004/0208245 A1 | 10/2004 | Macinnis et al. |
| 2004/0217971 A1 | 11/2004 | Kim |
| 2004/0255236 A1 | 12/2004 | Collart |
| 2005/0013494 A1 | 1/2005 | Srinivasan et al. |
| 2005/0015797 A1 | 1/2005 | Noblecourt et al. |
| 2005/0038826 A1 | 2/2005 | Bae et al. |
| 2005/0055399 A1 | 3/2005 | Savchuk |
| 2005/0063541 A1 | 3/2005 | Candelore |
| 2005/0076232 A1 | 4/2005 | Kawaguchi |
| 2005/0089091 A1 | 4/2005 | Kim et al. |
| 2005/0144468 A1 | 6/2005 | Northcutt |
| 2005/0157948 A1 | 7/2005 | Lee |
| 2005/0177741 A1 | 8/2005 | Chen et al. |
| 2005/0180641 A1 | 8/2005 | Clark |
| 2005/0193070 A1 | 9/2005 | Brown et al. |
| 2005/0193322 A1 | 9/2005 | Lamkin et al. |
| 2005/0196147 A1 | 9/2005 | Seo et al. |
| 2005/0207442 A1 | 9/2005 | Zoest et al. |
| 2005/0207578 A1 | 9/2005 | Matsuyama et al. |
| 2005/0210145 A1 | 9/2005 | Kim et al. |
| 2005/0243912 A1 | 11/2005 | Kwon et al. |
| 2005/0243922 A1* | 11/2005 | Magee ................ H04N 19/177 375/240.12 |
| 2005/0265555 A1 | 12/2005 | Pippuri |
| 2005/0273695 A1 | 12/2005 | Schnurr |
| 2005/0275656 A1 | 12/2005 | Corbin et al. |
| 2006/0013568 A1 | 1/2006 | Rodriguez |
| 2006/0015813 A1 | 1/2006 | Chung et al. |
| 2006/0039481 A1 | 2/2006 | Shen et al. |
| 2006/0072672 A1 | 4/2006 | Holcomb et al. |
| 2006/0078301 A1 | 4/2006 | Ikeda et al. |
| 2006/0093320 A1 | 5/2006 | Hallberg et al. |
| 2006/0126717 A1 | 6/2006 | Boyce et al. |
| 2006/0129909 A1 | 6/2006 | Butt et al. |
| 2006/0165163 A1 | 7/2006 | Burazerovic et al. |
| 2006/0168639 A1 | 7/2006 | Gan et al. |
| 2006/0173887 A1 | 8/2006 | Breitfeld et al. |
| 2006/0181965 A1 | 8/2006 | Collart |
| 2006/0182139 A1 | 8/2006 | Bugajski et al. |
| 2006/0235880 A1 | 10/2006 | Qian |
| 2006/0245727 A1 | 11/2006 | Nakano et al. |
| 2006/0259588 A1 | 11/2006 | Lerman et al. |
| 2006/0263056 A1 | 11/2006 | Lin et al. |
| 2006/0267986 A1 | 11/2006 | Bae |
| 2006/0274835 A1 | 12/2006 | Hamilton et al. |
| 2007/0005333 A1 | 1/2007 | Setiohardjo et al. |
| 2007/0024706 A1 | 2/2007 | Brannon, Jr. et al. |
| 2007/0031110 A1 | 2/2007 | Rijckaert |
| 2007/0047645 A1 | 3/2007 | Takashima |
| 2007/0047901 A1 | 3/2007 | Ando et al. |
| 2007/0053293 A1 | 3/2007 | Mcdonald et al. |
| 2007/0053444 A1 | 3/2007 | Shibata et al. |
| 2007/0067472 A1 | 3/2007 | Maertens et al. |
| 2007/0083467 A1 | 4/2007 | Lindahl et al. |
| 2007/0083617 A1 | 4/2007 | Chakrabarti et al. |
| 2007/0086528 A1 | 4/2007 | Mauchly et al. |
| 2007/0140647 A1 | 6/2007 | Kusunoki et al. |
| 2007/0154165 A1 | 7/2007 | Hemmeryckz-Deleersnijder et al. |
| 2007/0168541 A1 | 7/2007 | Gupta et al. |
| 2007/0168542 A1 | 7/2007 | Gupta et al. |
| 2007/0177812 A1 | 8/2007 | Yang et al. |
| 2007/0180051 A1 | 8/2007 | Kelly et al. |
| 2007/0180125 A1 | 8/2007 | Knowles et al. |
| 2007/0239839 A1 | 10/2007 | Buday et al. |
| 2007/0292107 A1 | 12/2007 | Yahata et al. |
| 2008/0025413 A1* | 1/2008 | Apostolopoulos ....... H04N 7/15 348/E7.083 |
| 2008/0030614 A1 | 2/2008 | Schwab |
| 2008/0052306 A1 | 2/2008 | Wang et al. |
| 2008/0063051 A1 | 3/2008 | Kwon et al. |
| 2008/0086570 A1 | 4/2008 | Dey et al. |
| 2008/0101466 A1 | 5/2008 | Swenson et al. |
| 2008/0101718 A1 | 5/2008 | Yang et al. |
| 2008/0104633 A1 | 5/2008 | Noblecourt et al. |
| 2008/0120330 A1 | 5/2008 | Reed et al. |
| 2008/0120342 A1 | 5/2008 | Reed et al. |
| 2008/0126248 A1 | 5/2008 | Lee et al. |
| 2008/0137736 A1 | 6/2008 | Richardson et al. |
| 2008/0137847 A1 | 6/2008 | Candelore et al. |
| 2008/0137848 A1 | 6/2008 | Kocher et al. |
| 2008/0192818 A1 | 8/2008 | DiPietro et al. |
| 2008/0196076 A1 | 8/2008 | Shatz et al. |
| 2008/0232456 A1 | 9/2008 | Terashima et al. |
| 2008/0253454 A1 | 10/2008 | Imamura et al. |
| 2008/0256105 A1 | 10/2008 | Nogawa et al. |
| 2008/0263354 A1 | 10/2008 | Beuque et al. |
| 2008/0266522 A1 | 10/2008 | Weisgerber |
| 2008/0279535 A1 | 11/2008 | Haque et al. |
| 2008/0310496 A1 | 12/2008 | Fang |
| 2009/0010622 A1 | 1/2009 | Yahata et al. |
| 2009/0013195 A1 | 1/2009 | Ochi et al. |
| 2009/0031220 A1 | 1/2009 | Tranchant et al. |
| 2009/0037959 A1 | 2/2009 | Suh et al. |
| 2009/0060452 A1 | 3/2009 | Chaudhri |
| 2009/0066839 A1 | 3/2009 | Jung et al. |
| 2009/0077143 A1 | 3/2009 | Macy, Jr. |
| 2009/0106082 A1 | 4/2009 | Senti et al. |
| 2009/0116821 A1 | 5/2009 | Shibamiya et al. |
| 2009/0132599 A1 | 5/2009 | Soroushian et al. |
| 2009/0132721 A1 | 5/2009 | Soroushian et al. |
| 2009/0150557 A1 | 6/2009 | Wormley et al. |
| 2009/0169181 A1 | 7/2009 | Priyadarshi et al. |
| 2009/0178090 A1 | 7/2009 | Oztaskent |
| 2009/0201988 A1 | 8/2009 | Gazier et al. |
| 2009/0226148 A1 | 9/2009 | Nesvadba et al. |
| 2009/0249081 A1 | 10/2009 | Zayas |
| 2009/0282162 A1 | 11/2009 | Mehrotra et al. |
| 2009/0293116 A1 | 11/2009 | DeMello |
| 2009/0300204 A1 | 12/2009 | Zhang et al. |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0310819 A1 | 12/2009 | Hatano |
| 2009/0313544 A1 | 12/2009 | Wood et al. |
| 2009/0313564 A1 | 12/2009 | Rottler et al. |
| 2009/0328124 A1 | 12/2009 | Khouzam et al. |
| 2010/0002069 A1 | 1/2010 | Eleftheriadis et al. |
| 2010/0040351 A1 | 2/2010 | Toma |

(56) References Cited

U.S. PATENT DOCUMENTS

| | | |
|---|---|---|
| 2010/0094969 A1 | 4/2010 | Zuckerman et al. |
| 2010/0095121 A1 | 4/2010 | Shetty et al. |
| 2010/0111192 A1 | 5/2010 | Graves |
| 2010/0142915 A1 | 6/2010 | Mcdermott et al. |
| 2010/0146055 A1 | 6/2010 | Hannuksela et al. |
| 2010/0158109 A1 | 6/2010 | Dahlby et al. |
| 2010/0189183 A1 | 7/2010 | Gu et al. |
| 2010/0195713 A1 | 8/2010 | Coulombe et al. |
| 2010/0226582 A1 | 9/2010 | Luo et al. |
| 2010/0228795 A1 | 9/2010 | Hahn |
| 2010/0259690 A1 | 10/2010 | Wang et al. |
| 2010/0262712 A1 | 10/2010 | Kim et al. |
| 2010/0278271 A1 | 11/2010 | MacInnis |
| 2010/0284473 A1 | 11/2010 | Suh et al. |
| 2011/0010466 A1 | 1/2011 | Fan et al. |
| 2011/0022432 A1 | 1/2011 | Ishida et al. |
| 2011/0055585 A1 | 3/2011 | Lee |
| 2011/0058675 A1 | 3/2011 | Brueck et al. |
| 2011/0080940 A1 | 4/2011 | Bocharov |
| 2011/0082924 A1 | 4/2011 | Gopalakrishnan |
| 2011/0096828 A1 | 4/2011 | Chen et al. |
| 2011/0099594 A1 | 4/2011 | Chen et al. |
| 2011/0103374 A1 | 5/2011 | Lajoie et al. |
| 2011/0126104 A1 | 5/2011 | Woods et al. |
| 2011/0126191 A1 | 5/2011 | Hughes et al. |
| 2011/0129011 A1 | 6/2011 | Cilli et al. |
| 2011/0135090 A1 | 6/2011 | Chan et al. |
| 2011/0142415 A1 | 6/2011 | Rhyu |
| 2011/0145858 A1 | 6/2011 | Philpott et al. |
| 2011/0150100 A1 | 6/2011 | Abadir |
| 2011/0153785 A1 | 6/2011 | Minborg et al. |
| 2011/0164679 A1 | 7/2011 | Satou et al. |
| 2011/0170408 A1 | 7/2011 | Furbeck et al. |
| 2011/0173345 A1 | 7/2011 | Knox et al. |
| 2011/0179185 A1 | 7/2011 | Wang et al. |
| 2011/0197261 A1 | 8/2011 | Dong et al. |
| 2011/0239078 A1 | 9/2011 | Luby et al. |
| 2011/0246659 A1 | 10/2011 | Bouazizi |
| 2011/0246661 A1 | 10/2011 | Manzari et al. |
| 2011/0268178 A1 | 11/2011 | Park et al. |
| 2011/0280307 A1 | 11/2011 | MacInnis et al. |
| 2011/0296048 A1 | 12/2011 | Knox et al. |
| 2011/0302319 A1 | 12/2011 | Ha et al. |
| 2011/0305273 A1 | 12/2011 | He et al. |
| 2011/0310982 A1 | 12/2011 | Yang et al. |
| 2011/0314130 A1 | 12/2011 | Strasman |
| 2011/0314176 A1 | 12/2011 | Frojdh et al. |
| 2011/0314500 A1 | 12/2011 | Gordon |
| 2012/0005312 A1 | 1/2012 | Mcgowan et al. |
| 2012/0023251 A1 | 1/2012 | Pyle et al. |
| 2012/0042090 A1 | 2/2012 | Chen et al. |
| 2012/0047542 A1 | 2/2012 | Lewis et al. |
| 2012/0072493 A1 | 3/2012 | Muriello et al. |
| 2012/0093214 A1 | 4/2012 | Urbach |
| 2012/0105279 A1 | 5/2012 | Brown et al. |
| 2012/0110120 A1 | 5/2012 | Willig et al. |
| 2012/0167132 A1 | 6/2012 | Mathews et al. |
| 2012/0170642 A1* | 7/2012 | Braness ............... H04N 21/435 375/E7.026 |
| 2012/0170643 A1 | 7/2012 | Soroushian et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0177101 A1 | 7/2012 | van der Schaar |
| 2012/0179834 A1 | 7/2012 | van der Schaar et al. |
| 2012/0203766 A1 | 8/2012 | Hörnkvist et al. |
| 2012/0230390 A1* | 9/2012 | Akkor ............... H04N 21/23655 375/E7.127 |
| 2012/0269275 A1 | 10/2012 | Hannuksela |
| 2012/0278496 A1 | 11/2012 | Hsu |
| 2012/0281767 A1 | 11/2012 | Duenas et al. |
| 2012/0307883 A1 | 12/2012 | Graves |
| 2012/0311174 A1 | 12/2012 | Bichot et al. |
| 2012/0316941 A1 | 12/2012 | Moshfeghi |
| 2012/0331167 A1 | 12/2012 | Hunt |
| 2013/0003868 A1 | 1/2013 | Sjoberg et al. |
| 2013/0007200 A1 | 1/2013 | van der Schaar et al. |
| 2013/0013803 A1 | 1/2013 | Bichot et al. |
| 2013/0019257 A1 | 1/2013 | Tschernutter et al. |
| 2013/0044821 A1 | 2/2013 | Braness et al. |
| 2013/0046902 A1 | 2/2013 | Villegas Nuñez et al. |
| 2013/0051767 A1 | 2/2013 | Soroushian et al. |
| 2013/0051768 A1 | 2/2013 | Soroushian et al. |
| 2013/0054958 A1 | 2/2013 | Braness et al. |
| 2013/0055084 A1 | 2/2013 | Soroushian et al. |
| 2013/0058393 A1* | 3/2013 | Soroushian .... H04N 21/234372 375/E7.026 |
| 2013/0061045 A1 | 3/2013 | Kiefer et al. |
| 2013/0080267 A1 | 3/2013 | McGowan |
| 2013/0091249 A1 | 4/2013 | McHugh et al. |
| 2013/0095855 A1 | 4/2013 | Bort |
| 2013/0097172 A1 | 4/2013 | McIntosh |
| 2013/0128970 A1 | 5/2013 | Yu et al. |
| 2013/0169863 A1 | 7/2013 | Smith |
| 2013/0188928 A1* | 7/2013 | Ogawa ................ H04N 9/8233 386/248 |
| 2013/0191754 A1 | 7/2013 | Rose |
| 2013/0196292 A1 | 8/2013 | Brennen et al. |
| 2013/0279810 A1 | 10/2013 | Li et al. |
| 2014/0003501 A1 | 1/2014 | Soroushian et al. |
| 2014/0003523 A1 | 1/2014 | Soroushian et al. |
| 2014/0059243 A1 | 2/2014 | Reisner |
| 2014/0140253 A1 | 5/2014 | Lohmar et al. |
| 2014/0149557 A1 | 5/2014 | Lohmar et al. |
| 2014/0189765 A1* | 7/2014 | Green ............. H04N 21/23805 725/110 |
| 2014/0211840 A1 | 7/2014 | Butt et al. |
| 2014/0241421 A1 | 8/2014 | Orton-jay et al. |
| 2014/0250473 A1 | 9/2014 | Braness et al. |
| 2014/0355958 A1 | 12/2014 | Soroushian et al. |
| 2014/0359680 A1 | 12/2014 | Shivadas et al. |
| 2015/0036758 A1 | 2/2015 | Sato |
| 2015/0104153 A1 | 4/2015 | Braness et al. |
| 2015/0229695 A1 | 8/2015 | Kim et al. |
| 2015/0281746 A1* | 10/2015 | Lam ................ H04N 21/23605 725/116 |
| 2015/0288530 A1 | 10/2015 | Oyman |
| 2016/0044078 A1 | 2/2016 | Hosur |
| 2016/0073176 A1 | 3/2016 | Phillips et al. |
| 2016/0119657 A1* | 4/2016 | Sun ................... H04N 21/8456 725/94 |
| 2016/0127440 A1 | 5/2016 | Gordon |
| 2016/0134881 A1* | 5/2016 | Wang ................. H04N 19/517 375/240.02 |
| 2016/0255348 A1* | 9/2016 | Panchagnula ........ H04N 19/146 375/240.02 |
| 2017/0026445 A1 | 1/2017 | Soroushian et al. |
| 2017/0041372 A1 | 2/2017 | Hosur |
| 2017/0041604 A1 | 2/2017 | Soroushian et al. |
| 2017/0055007 A1* | 2/2017 | Phillips ............. H04N 21/2353 |
| 2017/0123713 A1* | 5/2017 | Fisher .................... G06F 3/067 |
| 2017/0347135 A1* | 11/2017 | Frantz ................. H04N 21/242 |
| 2017/0366833 A1 | 12/2017 | Amidei et al. |
| 2018/0027244 A1 | 1/2018 | Chen et al. |
| 2018/0137208 A1 | 5/2018 | Ricker et al. |
| 2018/0242015 A1 | 8/2018 | Katsavounidis |
| 2018/0278975 A1 | 9/2018 | Soroushian |
| 2019/0082182 A1 | 3/2019 | Naser et al. |
| 2019/0146951 A1 | 5/2019 | Velmurugan et al. |
| 2019/0166410 A1 | 5/2019 | Kirk et al. |
| 2019/0182524 A1 | 6/2019 | Amidei et al. |
| 2020/0204834 A1 | 6/2020 | Loheide et al. |
| 2020/0221152 A1 | 7/2020 | Amidei et al. |
| 2020/0236376 A1 | 7/2020 | Li et al. |
| 2020/0252689 A1 | 8/2020 | Crowe |
| 2020/0322691 A1 | 10/2020 | Hui |
| 2020/0396451 A1 | 12/2020 | Soroushian et al. |

FOREIGN PATENT DOCUMENTS

| | | |
|---|---|---|
| CN | 1221284 A | 6/1999 |
| CN | 1662952 A | 8/2005 |
| CN | 1684518 A | 10/2005 |

(56) References Cited

FOREIGN PATENT DOCUMENTS

| | | |
|---|---|---|
| CN | 1723696 | 1/2006 |
| CN | 102138327 A | 7/2011 |
| CN | 103858419 A | 6/2014 |
| CN | 103875248 A | 6/2014 |
| CN | 105103565 A | 11/2015 |
| CN | 105359511 A | 2/2016 |
| CN | 103875248 B | 9/2018 |
| CN | 108989847 A | 12/2018 |
| CN | 109314784 A | 2/2019 |
| EP | 757484 A2 | 2/1997 |
| EP | 813167 A2 | 12/1997 |
| EP | 1335603 A2 | 8/2003 |
| EP | 1420580 A1 | 5/2004 |
| EP | 1453319 A1 | 9/2004 |
| EP | 1283640 B1 | 10/2006 |
| EP | 1718074 A1 | 11/2006 |
| EP | 2180664 A1 | 4/2010 |
| EP | 2360923 A1 | 8/2011 |
| EP | 2661895 A2 | 11/2013 |
| EP | 2962461 A1 | 1/2016 |
| EP | 3005689 A1 | 4/2016 |
| EP | 3473005 A1 | 4/2019 |
| HK | 1195183 B | 2/2018 |
| HK | 1260329 A | 12/2019 |
| HK | 1263223 A | 1/2020 |
| JP | 08163488 A | 6/1996 |
| JP | 08287613 A | 11/1996 |
| JP | 11328929 A | 11/1999 |
| JP | 2001043668 A | 2/2001 |
| JP | 2002170363 A | 6/2002 |
| JP | 2002218384 A | 8/2002 |
| JP | 2003250113 A | 9/2003 |
| JP | 2004320707 A | 11/2004 |
| JP | 2005027153 | 1/2005 |
| JP | 2009508452 A | 2/2009 |
| JP | 2010262255 A | 11/2010 |
| JP | 2011029962 A | 2/2011 |
| JP | 2013026724 A | 2/2013 |
| JP | 2014506430 A | 3/2014 |
| JP | 20165043 A | 1/2016 |
| JP | 2016526336 A | 9/2016 |
| JP | 2019-526188 A | 9/2019 |
| JP | 6892877 B2 | 6/2021 |
| KR | 100221423 B1 | 9/1999 |
| KR | 2002013664 | 2/2002 |
| KR | 1020020064888 A | 8/2002 |
| KR | 20040039852 A | 5/2004 |
| KR | 20060106250 A | 10/2006 |
| KR | 20110051104 A | 5/2011 |
| KR | 20140056317 A | 5/2014 |
| KR | 20160021141 A | 2/2016 |
| KR | 101823321 B1 | 1/2018 |
| KR | 101928910 B1 | 12/2018 |
| KR | 10-1936142 B1 | 1/2019 |
| KR | 10-1981923 B1 | 5/2019 |
| KR | 10-2020764 B1 | 9/2019 |
| KR | 10-2074148 B1 | 1/2020 |
| KR | 10-2086995 B1 | 3/2020 |
| KR | 10-2190364 B1 | 12/2020 |
| RU | 2328040 C2 | 6/2008 |
| WO | 1995015660 A1 | 6/1995 |
| WO | 2000049762 A2 | 8/2000 |
| WO | 2000049763 A1 | 8/2000 |
| WO | 2001031497 A1 | 5/2001 |
| WO | 2001050732 A2 | 7/2001 |
| WO | 2002001880 A1 | 1/2002 |
| WO | 2003047262 A2 | 6/2003 |
| WO | 2004012378 A2 | 2/2004 |
| WO | 2004054247 A1 | 6/2004 |
| WO | 2004097811 A1 | 11/2004 |
| WO | 2004100158 A1 | 11/2004 |
| WO | 2004102571 A1 | 11/2004 |
| WO | 2005008385 A2 | 1/2005 |
| WO | 2005015935 A1 | 2/2005 |
| WO | 2009006302 A1 | 1/2009 |
| WO | 2009065137 A1 | 5/2009 |
| WO | 2009109976 A2 | 9/2009 |
| WO | 2010060106 A1 | 5/2010 |
| WO | 2010122447 A1 | 10/2010 |
| WO | 2010150470 A1 | 12/2010 |
| WO | 2011053658 A1 | 5/2011 |
| WO | 2011059291 A2 | 5/2011 |
| WO | 2011087449 A1 | 7/2011 |
| WO | 2011093835 A1 | 8/2011 |
| WO | 2011101371 A1 | 8/2011 |
| WO | 2011102791 A1 | 8/2011 |
| WO | 2011103364 A1 | 8/2011 |
| WO | 2012094171 A1 | 7/2012 |
| WO | 20120094181 A2 | 7/2012 |
| WO | 20120094189 A1 | 7/2012 |
| WO | 2013033334 A1 | 3/2013 |
| WO | 2013033335 A1 | 3/2013 |
| WO | 2013033458 A2 | 3/2013 |
| WO | 2013033458 A3 | 5/2013 |
| WO | 2014121857 A1 | 8/2014 |
| WO | 2014190308 A1 | 11/2014 |
| WO | 2017218095 A1 | 12/2017 |

OTHER PUBLICATIONS

European Extended Search Report for EP Application 17813738.6, Search completed Oct. 18, 2019, dated Oct. 24, 2019, 9 pages.

European Search Report for Application 11855103.5, search completed Jun. 26, 2014, 9 pgs.

European Search Report for Application 11855237.1, search completed Jun. 12, 2014, 9 pgs.

European Supplementary Search Report for Application EP09759600, completed Jan. 25, 2011, 11 pgs.

Extended European Search Report for European Application EP12828956.8, Report Completed Feb. 18, 2015, dated Mar. 2, 2015, 13 Pages.

Extended European Search Report for European Application No. 14800901.2, Search completed Dec. 2, 2016, dated Dec. 13, 2016, 13 Pgs.

Federal Computer Week, "Tool Speeds Info to Vehicles", Jul. 25, 1999, 5 pages.

HTTP Live Streaming Overview, Networking & Internet, Apple, Inc., Apr. 1, 2011, 38 pages.

IBM Corporation and Microsoft Corporation, "Multimedia Programming Interface and Data Specifications 1.0", Aug. 1991, printed from http://www.kk.iij4u.or.jp/~kondo/wave/mpidata.txt on Mar. 6, 2006, 100 pgs.

Information Technology—MPEG Systems Technologies—Part 7: Common Encryption in ISO Base Media File Format Files (ISO/IEC 23001-7), Apr. 2015, 24 pgs.

InformationWeek, "Internet on Wheels", InformationWeek: Front End: Daily Dose, Jul. 20, 1999, Printed on Mar. 26, 2014, 3 pgs.

International Preliminary Report on Patentability for International Application No. PCT/US2008/083816, dated May 18, 2010, 6 pgs.

International Preliminary Report on Patentability for International Application No. PCT/US2012/053052, Completed Mar. 4, 2014, 8 pgs.

International Preliminary Report on Patentability for International Application No. PCT/US2012/053223, dated Mar. 4, 2014, 7 pgs.

International Preliminary Report on Patentability for International Application PCT/US2011/067167, dated Feb. 25, 2014, 8 pgs.

International Preliminary Report on Patentability for International Application PCT/US2014/039425, Report Issued Nov. 24, 2015, dated Dec. 3, 2015, 6 Pgs.

International Preliminary Report on Patentability for International Application PCT/US2017/031114, Report issued Dec. 18, 2018, dated Dec. 27, 2018, 7 Pgs.

International Search Report and Written Opinion for International Application No. PCT/US09/46588, completed Jul. 13, 2009, dated Jul. 23, 2009, 7 pgs.

International Search Report and Written Opinion for International Application No. PCT/US2004/041667, completed May 24, 2007, dated Jun. 20, 2007, 6 pgs.

(56) References Cited

OTHER PUBLICATIONS

International Search Report and Written Opinion for International Application No. PCT/US2008/083816, completed Jan. 10, 2009, dated Jan. 22, 2009, 7 pgs.
International Search Report and Written Opinion for International Application No. PCT/US2012/053052, International Filing Date Aug. 30, 2012, Report Completed Oct. 25, 2012, dated Nov. 16, 2012, 9 pgs.
International Search Report and Written Opinion for International Application No. PCT/US2012/053223, International Filing Date Aug. 30, 2012, Report Completed Dec. 7, 2012, dated Mar. 7, 2013, 10 pgs.
International Search Report and Written Opinion for International Application No. PCT/US2017/031114, Search completed Jun. 29, 2017, dated Jul. 19, 2017, 11 Pgs.
International Search Report and Written Opinion for International Application PCT/US2011/066927, completed Apr. 3, 2012, dated Apr. 20, 2012, 14 pgs.
International Search Report and Written Opinion for International Application PCT/US2011/067167, completed Jun. 19, 2012, dated Jul. 2, 2012, 11 pgs.
International Search Report and Written Opinion for International Application PCT/US2012/053053, search completed Oct. 23, 2012, dated Nov. 13, 2012, 11 pgs.
International Search Report for International Application No. PCT/SE2011/050166, Search completed Mar. 30, 2011, dated Mar. 30, 2011, 5 Pgs.
ISO/IEC 14496-12 Information technology—Coding of audio-visual objects—Part 12: ISO base media file format, Feb. 2004 ("MPEG-4 Part 12 Standard"), 62 pgs.
ISO/IEC 14496-12:2008(E) Informational Technology—Coding of Audio-Visual Objects Part 12: ISO Base Media File Format, Oct. 2008, 120 pgs.
ISO/IEC FCD 23001-6 MPEG systems technologies Part 6: Dynamic adaptive streaming over HTTP (DASH), Jan. 28, 2011, 86 pgs.
ITS International, "Fleet System Opts for Mobile Server", Aug. 26, 1999, Printed on Oct. 21, 2011 from http://www.itsinternational.com/News/article.cfm?recordID=547, 2 pgs.
Linksys Wireless-B Media Adapter Reviews, printed May 4, 2007 from http://reviews.cnet.com/Linksys_Wireless_B_Media_Adapter/4505-6739_7-30421900.html?tag=box, 5 pgs.
Linksys, KISS DP-500, printed May 4, 2007 from http://www.kiss-technology.com/?p=dp500, 2 pgs.
LINKSYS® : "Enjoy your digital music and pictures on your home entertainment center, without stringing wires!", Model No. WMA 11B, printed May 9, 2007 from http://www.linksys.com/servlet/Satellite?c=L_Product_C2&childpagename=US/Layout&cid=1115416830950&p.
Microsoft Corporation, "Chapter 8, Multimedia File Formats" 1991, Microsoft WIndows Multimedia Programmer's Reference, 3 cover pgs, pp. 8-1 to 8-20.
Microsoft Corporation, Advanced Systems Format (ASF) Specification, Revision 01.20.03, Dec. 2004, 121 pgs.
Microsoft Media Platform: Player Framework, "Microsoft Media Platform Player Framework v2.5 (formerly Silverlight Media Framework)", May 3, 2011, 2 pages.
Microsoft Media Platform: Player Framework, "Silverlight Media Framework v1.1", Jan. 2010, 2 pages.
Microsoft Windows® XP Media Center Edition 2005, Frequently asked Questions, printed May 4, 2007 from http://www.microsoft.com/windowsxp/mediacenter/evaluation/faq.mspx.
Microsoft Windows® XP Media Center Edition 2005: Features, printed May 9, 2007, from http://www.microsoft.com/windowsxp/mediacenter/evaluation/features.mspx, 4 pgs.
MPEG-DASH presentation at Streaming Media West 2011, Nov. 2011, 14 pgs.
Multiview Video Coding (MVC), ISO/IEC 14496-10, 2008 Amendment.
Open DML AVI-M-JPEG File Format Subcommittee, "Open DML AVI File Format Extensions", Version 1.02, Feb. 28, 1996, 29 pgs.

PC World.com, Future Gear: PC on the HiFi, and the TV, from http://www.pcworld.com/article/id,108818-page,1/article.html, printed May 4, 2007, from IDG Networks, 2 pgs.
Pomelo, LLC Tech Memo, Analysis of Netflix's Security Framework for 'Watch Instantly' Service, Mar.-Apr. 2009, 18 pgs.
Qtv—About BroadQ, printed May 11, 2009 from http://www.broadq.com/en/about.php, 1 pg.
Server-Side Stream Repackaging (Streaming Video Technologies Panorama, Part 2), Jul. 2011, 15 pgs.
Supplementary European Search Report for Application No. EP 04813918, Search Completed Dec. 19, 2012, 3 pgs.
Text of ISO/IEC 23001-6: Dynamic adaptive streaming over HTTP (DASH), Oct. 2010, 71 pgs.
Universal Mobile Telecommunications System (UMTS), ETSI TS 126 233 V9.1.0 (Jun. 2011) 3GPP TS 26.233 version 9.1.0 Release 9, 18 pgs.
Universal Mobile Telecommunications Systems (UMTS); ETSI TS 126 244 V9.4.0 (May 2011) 3GPP TS 26.244 version 9.4.0 Release 9, 58 pgs.
Windows Media Center Extender for Xbox, printed May 9, 2007 from http://www.xbox.com/en-US/support/systemuse/xbox/console/mediacenterextender.htm, 2 pgs.
Windows® XP Media Center Edition 2005, "Experience more entertainment", retrieved from http://download.microsoft.com/download/c/9/a/c9a7000a-66b3-455b-860b-1c16f2eecfec/MCE.pdf on May 9, 2007, 2 pgs.
International Search Report and Written Opinion for International Application PCT/US14/39425, International Filing Date Mar. 23, 2014, Report Completed Sep. 15, 2014, dated Oct. 17, 2014, 9 Pgs.
Written Opinion for International Application No. PCT/US2008/083816, Opinion completed Jan. 10, 2009, dated Jan. 22, 2009, 5 pgs.
Written Opinion for International Application No. PCT/US2009/046588, completed Jul. 14, 2009, dated Jul. 23, 2009, 5 pgs.
Written Opinion for International Application No. PCT/US2004/041667, Filing Date Dec. 8, 2004, Report Completed May 24, 2007, dated Jun. 20, 2007, 4 pgs.
"Innovation of technology arrived", I-O Data, Nov. 2004, Retrieved from http://www.iodata.com/catalogs/AVLP2DVDLA_Flyer200505.pdf on May 30, 2013, 2 pgs., I-O Data, 2 pgs.
"Adaptive HTTP Streaming in PSS—Client Behaviour", S4-AHI129, 3GPP TSG-SA4 Ad-Hoc Meeting, Dec. 14-16, 2009, Paris, France; section 12.6.1.
"Adaptive HTTP Streaming in PSS—Data Formats for HTTP-Streaming excluding MPD", S4-AHI128, 3GPP TSGSA4 Ad-Hoc Meeting, Dec. 14-16, 2009, Paris,France; sections 12.2.1 and 12.2.4.2.1.
"Adaptive HTTP Streaming in PSS—Discussion on Options", S4-AHI130, 3GPP TSG-SA4 Ad-Hoc Meeting, Dec. 14-16, 2009, Paris, France; sections 1, 2.7-2.8, and 2.16-2.19.
"Adaptive Streaming Comparison", Jan. 28, 2010, 5 pgs.
"Apple HTTP Live Streaming specification", Aug. 2017, 60 pgs.
"Best Practices for Multi-Device Transcoding", Kaltura Open Source Video, Printed on Nov. 27, 2013 from knowledge.kaltura.com/best-practices-multi-device-transcoding, 13 pgs.
"Container format (digital)", printed Aug. 22, 2009 from http://en.wikipedia.org/wiki/Container_format_(digital), 4 pgs.
"Data Encryption Decryption using AES Algorithm, Key and Salt with Java Cryptography Extension", Available at https://www.digizol.com/2009/10/java-encrypt-decrypt-jce-salt.html, October 200, 6 pgs.
"Delivering Live and On-Demand Smooth Streaming", Microsoft Silverlight, 2009, 28 pgs.
"DVD—MPeg differences", printed Jul. 2, 2009 from http://dvd.sourceforge.net/dvdinfo/dvdmpeg.html, 1 pg.
"DVD subtitles", sam.zoy.org/writings/dvd/subtitles, dated Jan. 9, 2001, printed Jul. 2, 2009, 4 pgs.
"Final Committee Draft of MPEG-4 streaming text format", International Organisation for Standardisation, Feb. 2004, 22 pgs.
"Fragmented Time Indexing of Representations", S4-AHI126, 3GPP TSG-SA4 Ad-Hoc Meeting, Dec. 14-16, 2009, Paris, France.
"HTTP Based Adaptive Streaming over HSPA", Apr. 2011, 73 pgs.
"HTTP Live Streaming", Mar. 2011, 24 pgs.
"HTTP Live Streaming", Sep. 2011, 33 pgs.

(56) References Cited

OTHER PUBLICATIONS

"Information Technology—Coding of audio-visual objects—Part 17: Streaming text", International Organisation for Standardisation, Feb. 2004, 22 pgs.
"Information technology—Coding of audio-visual objects—Part 18: Font compression and streaming", ISO/IEC 14496-18, First edition Jul. 1, 2004, 26 pgs.
"Information Technology—Coding of Audio Visual Objects—Part 2: Visual", International Standard, ISO/IEC 14496-2, Third Edition, Jun. 1, 2004, pp. 1-724. (presented in three parts).
"Java Cryptography Architecture API Specification & Reference", Available at https://docs.oracle.com/javase/1.5.0/docs/guide/security/CryptoSpec.html, Jul. 25, 2004, 68 pgs.
"Java Cryptography Extension, javax.crypto.Cipher class", Available at https://docs.oracle.com/javase/1.5.0/docs/api/javax/crypto/Cipher.html, 2004, 24 pgs.
"JCE Encryption—Data Encryption Standard (DES) Tutorial", Available at https://mkyong.com/java/jce-encryption-data-encryption-standard-des-tutorial/, Feb. 25, 2009, 2 pgs.
"KISS Players, KISS DP-500", retrieved from http://www.kiss-technology.com/?p=dp500 on May 4, 2007, 1 pg.
"Live and On-Demand Video with Silverlight and IIS Smooth Streaming", Microsoft Silverlight, Windows Server Internet Information Services 7.0, Feb. 2010, 15 pgs.
"Microsoft Smooth Streaming specification", Jul. 22, 2013, 56 pgs.
"MPEG ISO/IEC 13818-1", Information Technology—Generic Coding Of Moving Pictures And Associated Audio: Systems, Apr. 25, 1995, 151 pages.
"MPEG-4, Part 14, ISO/IEC 14496-14", Information technology—Coding of audio-visual objects, 18 pgs., Nov. 15, 2003.
"Netflix turns on subtitles for PC, Mac streaming", Yahoo! News, Apr. 21, 2010, Printed on Mar. 26, 2014, 3 pgs.
"OpenDML AVI File Format Extensions", OpenDML AVI M-JPEG File Format Subcommittee, retrieved from www.the-labs.com/Video/odmlff2-avidef.pdf, Sep. 1997, 42 pgs.
"OpenDML AVI File Format Extensions Version 1.02", OpenDML AVI MJPEG File Format Subcommittee. Last revision: Feb. 28, 1996. Reformatting: Sep. 1997, 42 pgs.
"QCast Tuner for PS2", printed May 11, 2009 from http://web.archive.org/web/20030210120605/www.divx.com/software/det ail.php?ie=39, 2 pgs.
"Single-Encode Streaming for Multiple Screen Delivery", Telestream Wowza Media Systems, 2009, 6 pgs.
"Smooth Streaming Client", The Official Microsoft IIS Site, Sep. 24, 2010, 4 pages.
"Supported Media Formats", Supported Media Formats, Android Developers, Printed on Nov. 27, 2013 from developer.android.com/guide/appendix/media-formats.html, 3 pgs.
"Text of ISO/IEC 14496-18/COR1, Font compression and streaming", ITU Study Group 16—Video Coding Experts Group—ISO/IEC MPEG & ITU-T VCEG(ISO/IEC JTC1/SC29/WG11 and ITU-T SG16 06), No. N8664, Oct. 27, 2006, 8 pgs.
"Text of ISO/IEC 14496-18/FDIS, Coding of Moving Pictures and Audio", ITU Study Group 16—Videocoding Experts Group—ISO/IEC MPEG & ITU-T VCEG(ISO/IEC JTC1/SC29/WG11 and ITU-T SG16 06), No. N6215, Dec. 2003, 26 pgs.
"The MPEG-DASH Standard for Multimedia Streaming Over the Internet", IEEE MultiMedia, vol. 18, No. 4, 2011, 7 pgs.
"Thread: SSME (Smooth Streaming Medial Element) config.xml review (Smooth Streaming Client configuration file)", Printed on Mar. 26, 2014, 3 pgs.
"Transcoding Best Practices", From movideo, Printed on Nov. 27, 2013 from code.movideo.com/Transcoding_Best_Practices, 5 pgs.
"Transparent end-to-end packet switched streaming service (PSS); 3GPP file format (3GP) (Release 9)", 3GPP TS 26.244 V9.0.0 (Dec. 2009),sections 7.1-7.4.
"Using HTTP Live Streaming", iOS Developer Library, http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, Feb. 11, 2014, 10 pgs.
"Video Manager and Video Title Set IFO file headers", printed Aug. 22, 2009 from http://dvd.sourceforge.net/dvdinfo/ifo.htm, 6 pgs.
"What is a DVD?", printed Aug. 22, 2009 from http://www.videohelp.com/dvd, 8 pgs.
"What is a VOB file", http://www.mpucoder.com/DVD/vobov.html, printed on Jul. 2, 2009, 2 pgs.
"What's on a DVD?", printed Aug. 22, 2009 from http://www.doom9.org/dvd-structure.htm, 5 pgs.
"Windows Media Player 9", Microsoft, Mar. 23, 2017, 3 pgs.
"DVD-Mpeg differences", printed on Jul. 2, 2009, http://dvd.sourceforge.net/dvdinfo/dvdmpeg.html, 1 pg.
U.S. Appl. No. 13/224,298, "Final Office Action Received", dated May 19, 2014, 26 pgs.
Abomhara et al., "Enhancing Selective Encryption for H.264/AVC Using Advanced Encryption Standard", International Journal of computer Theory and Engineering, Apr. 2010, vol. 2, No. 2, pp. 223-229.
Akhshabi et al., "An Experimental Evaluation of Rate-Adaptation Algorithms in Adaptive Streaming over HTTP", MMSys'11, Feb. 23-25, 2011, 12 pgs.
Alattar et al., A.M., "Improved selective encryption techniques for secure transmission of MPEG video bit-streams", In Proceedings 1999 International Conference on Image Processing (Cat. 99CH36348), vol. 4, IEEE, 1999, pp. 256-260.
Anonymous, "Method for the encoding of a compressed video sequence derived from the same video sequence compressed at a different bit rate without loss of data", ip.com, ip.com No. IPCOM000008165D, May 22, 2002, pp. 1-9.
Antoniou et al., "Adaptive Methods for the Transmission of Video Streams in Wireless Networks", 2015, 50 pgs.
Apostolopoulos et al., "Secure Media Streaming and Secure Transcoding", Multimedia Security Technologies for Digital Rights Management, 2006, 33 pgs.
Asai et al., "Essential Factors for Full-Interactive VOD Server: Video File System, Disk Scheduling, Network", Proceedings of Globecom '95, Nov. 14-16, 1995, 6 pgs.
Beker et al., "Cipher Systems, The Protection of Communications", 1982, 40 pgs.
Blasiak, "Video Transrating and Transcoding: Overview of Video Transrating and Transcoding Technologies", Ingenient Technologies, TI Developer Conference, Aug. 6-8, 2002, 22 pgs.
Bocharov et al, "Portable Encoding of Audio-Video Objects, The Protected Interoperable File Format (PIFF)", Microsoft Corporation, First Edition Sep. 8, 2009, 30 pgs.
Bulterman et al., "Synchronized Multimedia Integration Language (SMIL 3.0)", W3C Recommendation, Dec. 1, 2008, https://www.w3.org/TR/2008/REC-SMIL3-20081201/, 321 pgs. (presented in five parts).
Cahill et al.,"Locally Adaptive Deblocking Filter for Low Bit Rate Video", Proceedings 2000 International Conference on Image Processing, Sep. 10-13, 2000, Vancouver, BC, Canada, 4 pgs.
Candelore, File Wrapper, U.S. Appl. No. 60/372,901, filed Apr. 17, 2002, 5 pgs.
Casares et al., "Simplifying Video Editing Using Metadata", DIS2002, 2002, pp. 157-166.
Chaddha et al., "A Frame-work for Live Multicast of Video Streams over the Internet", Proceedings of 3rd IEEE International Conference on Image Processing, Sep. 19, 1996, Lausanne, Switzerland, 4 pgs.
Cheng, "Partial Encryption for Image and Video Communication", Thesis, Fall 1998, 95 pgs.
Cheng et al., "Partial encryption of compressed images and videos", IEEE Transactions on Signal Processing, vol. 48, No. 8, Aug. 2000, 33 pgs.
Cheung et al., "On the Use of Destination Set Grouping to Improve Fairness in Multicast Video Distribution", Proceedings of IEEE INFOCOM'96, Conference on Computer Communications, vol. 2, IEEE, 1996, 23 pgs.
Collet, "Delivering Protected Content, An Approach for Next Generation Mobile Technologies", Thesis, 2010, 84 pgs.

(56) References Cited

OTHER PUBLICATIONS

Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 29, 2011, 14 pgs.
Diamantis et al., "Real Time Video Distribution using Publication through a Database", Proceedings SIBGRAPI'98. International Symposium on Computer Graphics, Image Processing, and Vision (Cat. No. 98EX237), Oct. 1990, 8 pgs.
Ding, Li-Fu et al., "Content-Aware Prediction Algorithm With Inter-View Mode Decision for Multiview Video Coding", IEEE Transactions on Multimedia, vol. 10, No. 8, Dec. 2008., Dec. 8, 2008, 12 Pages.
Dworkin, "Recommendation for Block Cipher Modes of Operation: Methods and Techniques", NIST Special Publication 800-38A, 2001, 66 pgs.
Fang et al., "Real-time deblocking filter for MPEG-4 systems", Asia-Pacific Conference on Circuits and Systems, Oct. 28-31, 2002, Bail, Indonesia, pp. 541-544.
Fecheyr-Lippens, , "A Review of HTTP Live Streaming", Jan. 2010, 38 pgs.
Fielding et al., "Hypertext Transfer Protocol—HTTP1.1", Network Working Group, RFC 2616, Jun. 1999, 114 pgs.
Fukuda et al., "Reduction of Blocking Artifacts by Adaptive DCT Coefficient Estimation in Block-Based Video Coding", Proceedings 2000 International Conference on Image Processing, Sep. 10-13, 2000, Vancouver, BC, Canada, pp. 969-972.
Gannes, "The Lowdown on Apple's HTTP Adaptive Bitrate Streaming", GigaOM, Jun. 10, 2009, 12 pgs.
Ghosh, "Enhancing Silverlight Video Experiences with Contextual Data", Retrieved from: http://msdn.microsoft.com/en-us/magazine/ee336025.aspx, 2010, 15 pgs.
Griffith, Eric, "The Wireless Digital Picture Frame Arrives", Wi-Fi Planet, printed May 4, 2007 from http://www.wi-fiplanet.com/news/article.php/3093141, Oct. 16, 2003, 3 pgs.
Huang, U.S. Pat. No. 7,729,426, U.S. Appl. No. 11/230,794, filed Sep. 20, 2005, 143 pgs.
Huang et al., "Adaptive MLP post-processing for block-based coded images", IEEE Proceedings—Vision, Image and Signal Processing, vol. 147, No. 5, Oct. 2000, pp. 463-473.
Huang et al., Architecture Design for Deblocking Filter in H.264/JVT/AVC, 2003 International Conference on Multimedia and Expo., Jul. 6-9, 2003, Baltimore, MD, 4 pgs.
Inlet Technologies, "Adaptive Delivery to iDevices", 2010, 2 pages.
Inlet Technologies, "Adaptive delivery to iPhone 3.0", 2009, 2 pgs.
Inlet Technologies, "HTTP versus RTMP", 2009, 3 pages.
Inlet Technologies, "The World's First Live Smooth Streaming Event: The French Open", 2009, 2 pages.
I-O Data, "Innovation of technology arrived", Nov. 2004, Retrieved from http://www.iodata.com/catalogs/AVLP2DVDLA_Flyer200505.pdf, 2 pgs.
Jain et al., U.S. Appl. No. 61/522,623, filed Aug. 11, 2011, 44 pgs.
Jeannin, Sylvie et al., "Video Motion Representation for Improved Content Access", IEEE Transactions on Consumer Electronics, vol. 46, No. 3., Aug. 2004, 11 Pages.
Jung et al., "Design and Implementation of an Enhanced Personal Video Recorder for DTV", IEEE Transactions on Consumer Electronics, vol. 47, No. 4, Nov. 2001, 6 pgs.
Kalva, Hari, "Delivering MPEG-4 Based Audio-Visual Services", 2001, 113 pgs.
Kang et al., "Access Emulation and Buffering Techniques for Steaming of Non-Stream Format Video Files", IEEE Transactions on Consumer Electronics, vol. 43, No. 3, Aug. 2001, 7 pgs.
Karouia et al., "Video Similarity Measurement Based on Attributed Relational Graph Matching", N.T. Nguyen, R. Katarzyniak (Eds.): New Challenges in Applied Intelligence Technologies, SCI 134, pp. 173-182, 2008, 10 Pages.
Kim, Seon H. et al., "Design and implementation of geo-tagged video search framework", Journal of Visual Communication and Image Representation, 2010, vol. 21 (2010), pp. 773-786.
Kim et al, "A Deblocking Filter with Two Separate Modes in Block-Based Video Coding", IEEE transactions on circuits and systems for video technology, vol. 9, No. 1, 1999, pp. 156-160.
Kim et al., "Tree-Based Group Key Agreement", Feb. 2004, 37 pgs.
Kurzke et al., "Get Your Content Onto Google TV", Google, Retrieved from http://commondatastorage.googleapis.com/io2012/presentations/live%20to%20website/1300.pdf, 2012, 58 pgs.
Lang, "Expression Encoder, Best Practices for live smooth streaming broadcasting", Microsoft Corporation, 2010, retrieved from http://www.streamingmedia.com/conferences/west2010/presentations/SMWest-12010-Expression-Encoder.pdf, 20 pgs.
Laukens, "Adaptive Streaming—A Brief Tutorial", EBU Technical Review, 2011, 6 pgs.
Legault et al., "Professional Video Under 32-bit Windows Operating Systems", SMPTE Journal, vol. 105, No. 12, Dec. 1996, 10 pgs.
Levkov, "Mobile Encoding Guidelines for Android Powered Devices", Adobe Systems Inc., Addendum B, Dec. 22, 2010, 42 pgs.
Lewis, "H.264/MPEG-4 AVC CABAC overview", Oct. 25, 2012, printed Jun. 24, 2013 from http://www.web.archive.org/web/20121025003926/www.theonlineoasis.co.uk/notes.html, 3 pgs.
Li et al., "Layered Video Multicast with Retransmission (LVMR): Evaluation of Hierarchical Rate Control", Proceedings of IEEE INFOCOM'98, the Conference on Computer Communications. Seventeenth Annual Joint Conference of the IEEE Computer and Communications Societies. Gateway to the 21st Century, Cat. No. 98, vol. 3, 1998, 26 pgs.
List et al., "Adaptive deblocking filter", IEEE transactions on circuits and systems for video technology, vol. 13, No. 7, Jul. 2003, pp. 614-619.
Long et al., "Silver: Simplifying Video Editing with Metadata", Demonstrations, CHI 2003: New Horizons, Apr. 5-10, 2003, pp. 628-629.
Massoudi et al., "Overview on Selective Encryption of Image and Video: Challenges and Perspectives", EURASIP Journal on Information Security, Nov. 2008, 18 pgs.
McCanne et al., "Receiver-driven Layered Multicast", Conference proceedings on Applications, technologies, architectures, and protocols for computer communications, Aug. 1996, 14 pgs.
Meier, "Reduction of Blocking Artifacts in Image and Video Coding", IEEE Transactions on Circuits and Systems for Video Technology, vol. 9, No. 3, Apr. 1999, pp. 490-500.
Morrison, "EA IFF 85 Standard for Interchange Format Files", Jan. 14, 1985, printed from http://www.dcs.ed.ac.uk/home/mxr/gfx/2d/IFF.txt on Mar. 6, 2006, 24 pgs.
MSDN, "Adaptive streaming, Expression Studio 2.0", Apr. 23, 2009, 2 pgs.
Nelson, "Arithmetic Coding + Statistical Modeling = Data Compression: Part 1—Arithmetic Coding", Doctor Dobb's Journal, Feb. 1991, USA, pp. 1-12.
Nelson, "Smooth Streaming Deployment Guide", Microsoft Expression Encoder, Aug. 2010, 66 pgs.
Newton et al., "Preserving Privacy by De-identifying Facial Images", Carnegie Mellon University School of Computer Science, Technical Report, CMU-CS-03-119, Mar. 2003, 26 pgs.
Noboru, "Play Fast and Fine Video on Web! codec", col. 9 No. 12, Dec. 1, 2003, pp. 178-179.
Noe, A., "Matroska File Format (under construction!)", Retrieved from the Internet: URL:http://web.archive.orgweb/20070821155146/www.matroska.org/technical/specs/matroska.pdf [retrieved on Jan. 19, 2011], Jun. 24, 2007, 1-51.
Noe, Alexander, "AVI File Format", http://www.alexander-noe.com/video/documentation/avi.pdf, Dec. 14, 2006, pp. 1-26.
Noe, Alexander, "Definitions", Apr. 11, 2006, retrieved from http://www.alexander-noe.com/video/amg/definitions.html on Oct. 16, 2013, 2 pages.
O'Brien, U.S. Appl. No. 60/399,846, filed Jul. 30, 2002, 27 pgs.
O'Rourke, "Improved Image Decompression for Reduced Transform Coding Artifacts", IEEE Transactions on Circuits and Systems for Video Technology, vol. 5, No. 6, Dec. 1995, pp. 490-499.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.

(56) References Cited

OTHER PUBLICATIONS

Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.
Park et al., "A postprocessing method for reducing quantization effects in low bit-rate moving picture coding", IEEE Transactions on Circuits and Systems for Video Technology, vol. 9, No. 1, Feb. 1999, pp. 161-171.
Phamdo, "Theory of Data Compression", printed on Oct. 10, 2003, 12 pgs.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.
Richardson, "H.264 and MPEG-4 Video Compression", Wiley, 2003, 306 pgs. (presented in 2 parts).
Schulzrinne et al., "Real Time Streaming Protocol (RTSP)", Internet Engineering Task Force, RFC 2326, Apr. 1998, 80 pgs.
Siglin, "HTTP Streaming: What You Need to Know", streamingmedia.com, 2010, 15 pages.
Siglin, "Unifying Global Video Strategies, MP4 File Fragmentation for Broadcast, Mobile and Web Delivery", Nov. 16, 2011, 16 pgs.
Sima et al., "An Efficient Architecture for Adaptive Deblocking Filter of H.264 AVC Video Coding", IEEE Transactions on Consumer Electronics, vol. 50, No. 1, Feb. 2004, pp. 292-296.
Spanos et al., "Performance Study of a Selective Encryption Scheme for the Security of Networked, Real-Time Video", Proceedings of the Fourth International Conference on Computer Communications and Networks, IC3N'95, Sep. 20-23, 1995, Las Vegas, NV, pp. 2-10.
Srinivasan et al., "Windows Media Video 9: overview and applications", Signal Processing: Image Communication, 2004, 25 pgs.
Stockhammer, "Dynamic Adaptive Streaming over HTTP—Standards and Design Principles", Proceedings of the second annual ACM conference on Multimedia, Feb. 2011, pp. 133-145.
Taxan, "AVel LinkPlayer2 for Consumer", I-O Data USA—Products—Home Entertainment, printed May 4, 2007 from http://www.iodata.com/usa/products/products.php?cat=HNP&sc=AVEL&pld=AVLP2/DVDLA&ts=2&tsc, 1 pg.
Timmerer et al., "HTTP Streaming of MPEG Media", Proceedings of Streaming Day, 2010, 4 pgs.
Tiphaigne et al., "A Video Package for Torch", Jun. 2004, 46 pgs.
Trappe et al., "Key Management and Distribution for Secure Multimedia Multicast", IEEE Transaction on Multimedia, vol. 5, No. 4, Dec. 2003, pp. 544-557.
Unknown, "AVI RIFF File Reference (Direct X 8.1 C++ Archive)", printed from http://msdn.microsoft.com/archive/en-us/dx81_c/directx_cpp/htm/avirifffilereference.asp?fr . . . on Mar. 6, 2006, 7 pgs.
Unknown, "Entropy and Source Coding (Compression)", TCOM 570, Sep. 1999, pp. 1-22.
Unknown, "MPEG-4 Video Encoder: Based on International Standard ISO/IEC 14496-2", Patni Computer Systems, Ltd., publication date unknown, 15 pgs.
Van Deursen et al., "On Media Delivery Protocols in the Web", 2010 IEEE International Conference on Multimedia and Expo, Jul. 19-23, 2010, 6 pgs.
Ventura, Guillermo Albaida, "Streaming of Multimedia Learning Objects", AG Integrated Communication System, Mar. 2003, 101 pgs.
Waggoner, "Compression for Great Digital Video", 2002, 184 pgs.
Watanabem et al., "MPEG-2 decoder enables DTV trick plays", esearcher System LSI Development Lab, Fujitsu Laboratories Ltd., Kawasaki, Japan, Jun. 2001, 2 pgs.
Watson, Mark, "Input for DASH EE#1 (CMP): Pixel Aspect Ratio", 94. MPEG Meeting; Nov. 10, 2010-Oct. 15, 2010; Guangzhou; (Motion Picture Expert Group or ISO/IEC JTC1/SC29/WG11), No. M18498, Oct. 28, 2010 (Oct. 28, 2010), XP030047088,, Oct. 2, 2010, 4 Pages.
Westerink et al., "Two-pass MPEG-2 variable-bit-rate encoding", IBM Journal of Research and Development, International Business Machines Corporation, New York, NY, US, XP002395114, ISSN: 0018-8646, vol. 43, No. 4, Jul. 4, 1999, pp. 471-488.
Wiegand, "Joint Video Team (JVT) of ISO/IEC MPEG and ITU-T VCEG", Jan. 2002, 70 pgs.
Willig et al., U.S. Appl. No. 61/409,285, filed Nov. 2, 2010, 43 pgs.
Wu et al., "A Hierarchical Reliability-Driven Scheduling for Cloud Video Transcoding", International Conference on Machine Learning and Cybernetics Jul. 12, 2015 pp. 456-457.
Yang et al., "Projection-Based Spatially Adaptive Reconstruction of Block-Transform Compressed Images", IEEE Transactions on Image Processing, vol. 4, No. 7, Jul. 1995, pp. 896-908.
Yang et al., "Regularized Reconstruction to Reduce Blocking Artifacts of Block Discrete Cosine Transform Compressed Images", IEEE Transactions on Circuits and Systems for Video Technology, vol. 3, No. 6, Dec. 1993, pp. 421-432.
Yu et al., "Video deblocking with fine-grained scalable complexity for embedded mobile computing", Proceedings 7th International Conference on Signal Processing, Aug. 31-Sep. 4, 2004, pp. 1173-1178.
Zakhor, "Iterative Procedures for Reduction of Blocking Effects in Transform Image Coding", IEEE Transactions on Circuits and Systems for Video Technology, vol. 2, No. 1, Mar. 1992, pp. 91-95.
Zambelli, "IIS Smooth Streaming Technical Overview", Microsoft Corporation, Mar. 2009.
Azwar et al., "H.265 video delivery using dynamic adaptive streaming over HTTP (DASH) on LAN network", 2014 8th International Conference on Telecommunication Systems Services and Applications (TSSA), Mar. 26, 2015.
Zhu et al., "Comparison and Analysis of MPEG-DASH and HLS Adaptive Streaming Delivery Technology", Telecommunications Science, Issue 04, Apr. 20, 2015.

* cited by examiner

SYSTEMS AND METHODS FOR ENCODING VIDEO CONTENT

CROSS REFERENCE TO RELATED APPLICATIONS

The current application is a continuation of U.S. patent application Ser. No. 16/819,865, filed Mar. 16, 2020, entitled "Systems and Methods for Encoding Video Content" to Amidei et al., which is a continuation of U.S. patent application Ser. No. 16/208,210, filed Dec. 3, 2018, entitled "Systems and Methods for Encoding Video Content" to Amidei et al., which is a continuation of U.S. patent application Ser. No. 15/183,562, filed Jun. 15, 2016, entitled "Systems and Methods for Encoding Video Content" to Amidei et al., the disclosures of which are expressly incorporated by reference herein in their entirety.

FIELD OF THE INVENTION

The present invention generally relates to adaptive streaming and more specifically to systems that encode video data into streams having different maximum bitrates and playback devices that use the streams to obtain encoded video content from the encoded streams.

BACKGROUND

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the user's network bandwidth and CPU capacity) in real time and adjusting the quality of the streamed media accordingly. Typically, the source media is encoded at multiple bit rates and the playback device or client switches between streaming the different encodings depending on available resources.

Adaptive streaming solutions typically utilize either Hypertext Transfer Protocol (HTTP), published by the Internet Engineering Task Force and the World Wide Web Consortium as RFC 2616, or Real Time Streaming Protocol (RTSP), published by the Internet Engineering Task Force as RFC 2326, to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device. RTSP is a network control protocol used to control streaming media servers. Playback devices issue control commands, such as "play" and "pause", to the server streaming the media to control the playback of media files. When RTSP is utilized, the media server records the state of each client device and determines the media to stream based upon the instructions received from the client devices and the client's state.

In adaptive streaming systems, the source media is typically stored on a media server as a top level index file or manifest pointing to a number of alternate streams that contain the actual video and audio data. Each stream is typically stored in one or more container files. Different adaptive streaming solutions typically utilize different index and media containers. The Synchronized Multimedia Integration Language (SMIL) developed by the World Wide Web Consortium is utilized to create indexes in several adaptive streaming solutions including IIS Smooth Streaming developed by Microsoft Corporation of Redmond, Wash., and Flash Dynamic Streaming developed by Adobe Systems Incorporated of San Jose, Calif. HTTP Adaptive Bitrate Streaming developed by Apple Computer Incorporated of Cupertino, Calif. implements index files using an extended M3U playlist file (.M3U8), which is a text file containing a list of URIs that typically identify a media container file. The most commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Flash Dynamic Streaming. The TS container is used in HTTP Adaptive Bitrate Streaming.

The Matroska container is a media container developed as an open standard project by the Matroska non-profit organization of Aussonne, France. The Matroska container is based upon Extensible Binary Meta Language (EBML), which is a binary derivative of the Extensible Markup Language (XML). Decoding of the Matroska container is supported by many consumer electronics (CE) devices. The DivX Plus file format developed by DivX, LLC of San Diego, Calif. utilizes an extension of the Matroska container format (i.e. is based upon the Matroska container format, but includes elements that are not specified within the Matroska format).

To provide a consistent means for the delivery of media content over the Internet, the International Organization for Standardization (ISO) and the International Electrotechnical Commission (IEC) have put forth the Dynamic Adaptive Streaming over HTTP (DASH) standard. The DASH standard specifies formats for the media content and the description of the content for delivery of MPEG content using HTTP. In accordance with DASH, each component of media content for a presentation is stored in one or more streams. Each of the streams is divided into segments. A Media Presentation Description (MPD) is a data structure that includes information about the segments in each of the stream and other information needed to present the media content during playback. A playback device uses the MPD to obtain the components of the media content using adaptive bit rate streaming for playback.

As the speed at which streaming content has improved. Streaming of live events, such as sporting events and concerts has become popular. However, it is a problem to encode the video content from a live event into streams for adaptive bitrate streaming. To do so, encoder server systems typically use hardware encoders that are specifically designed to encode the video content into the various streams. These specialized encoders are expensive to obtain. Thus, those skilled in the art are constantly striving to find lower cost alternatives to the specialized encoders.

SUMMARY OF THE INVENTION

Systems and methods for encoding video content into multiple streams having different maximum bitrates and to obtaining the video content using playback devices in accordance with some embodiments of the invention are disclosed. The process in accordance to many embodiments is performed in the following manner. Each server in an encoding system receives portions of a source stream of video content from a content provider system. Each of the encoders encodes a portion of the alternative streams using the portions of the source stream received in each of the encoders. The portions of the alternative streams encoded by each particular one of the encoders is stored in a container for the particular one of the encoder. Each of the encoders then generates index information for the portions of the alternatives streams generated by the each encoder and stores the index information in a manifest for the portion of the alternative streams generated by the particular encoder.

In accordance with some embodiments of the invention, the portion of the alternative streams encoded by each of the encoders is one of the alternative streams and a stream is generated be each encoder in the following manner. The encoder receives each portion of the source stream and encodes a segment of an alternative stream from each portion of the source stream to generate the segments of the alternative stream. In accordance with a number of these embodiments, each particular encoder has a particular set of parameters for generating a stream. Each encoder also generates index information for each of the segments generated by the particular encoder and store the index information in a manifest for the particular encoder. In accordance with several of these embodiments, the alterative stream generated by a particular encoder has a particular maximum bitrate as a parameter. In accordance with still further of some of these embodiments, at least two alternative streams of the alternative streams generated by different ones of the encoders have a same maximum bitrate and at least one other parameter that is different. In accordance with many of these embodiments, the at least one other parameter is selected from a group of parameters consisting of aspect ratio, frame rate, and resolution.

In accordance with some embodiments of the invention, the system includes N encoders where N is an integer and each of the N encoders encode 1/N of the portions of the source streams into segments of each of the alternative streams. In accordance with some embodiments the encoding of 1/N portions of the source streams into segments in each of the alternative streams is performed in the following manner. Each encoder is assigned an Mth encoding order where M is an integer from 1 to N. Each encoder determines the Mth portion of the source stream received and every Nth portion received thereafter from the source stream as a set of portions of the source stream for the Mth encoder to encode. The encoding of a portion includes encoding the portion into a segment in each one of the alternative streams. The generating of the index information includes generating index information for each of segments generated for each of the portions in each of the alternative streams and storing the index information for each of the segments generated from each portion in the set of portions in a manifest for the Mth encoder. In accordance with some of these embodiments, each Mth encoder discards each of the portions that is not in the set of portions for the Mth encoder.

DETAILED DISCLOSURE OF THE INVENTION

Figure 1:
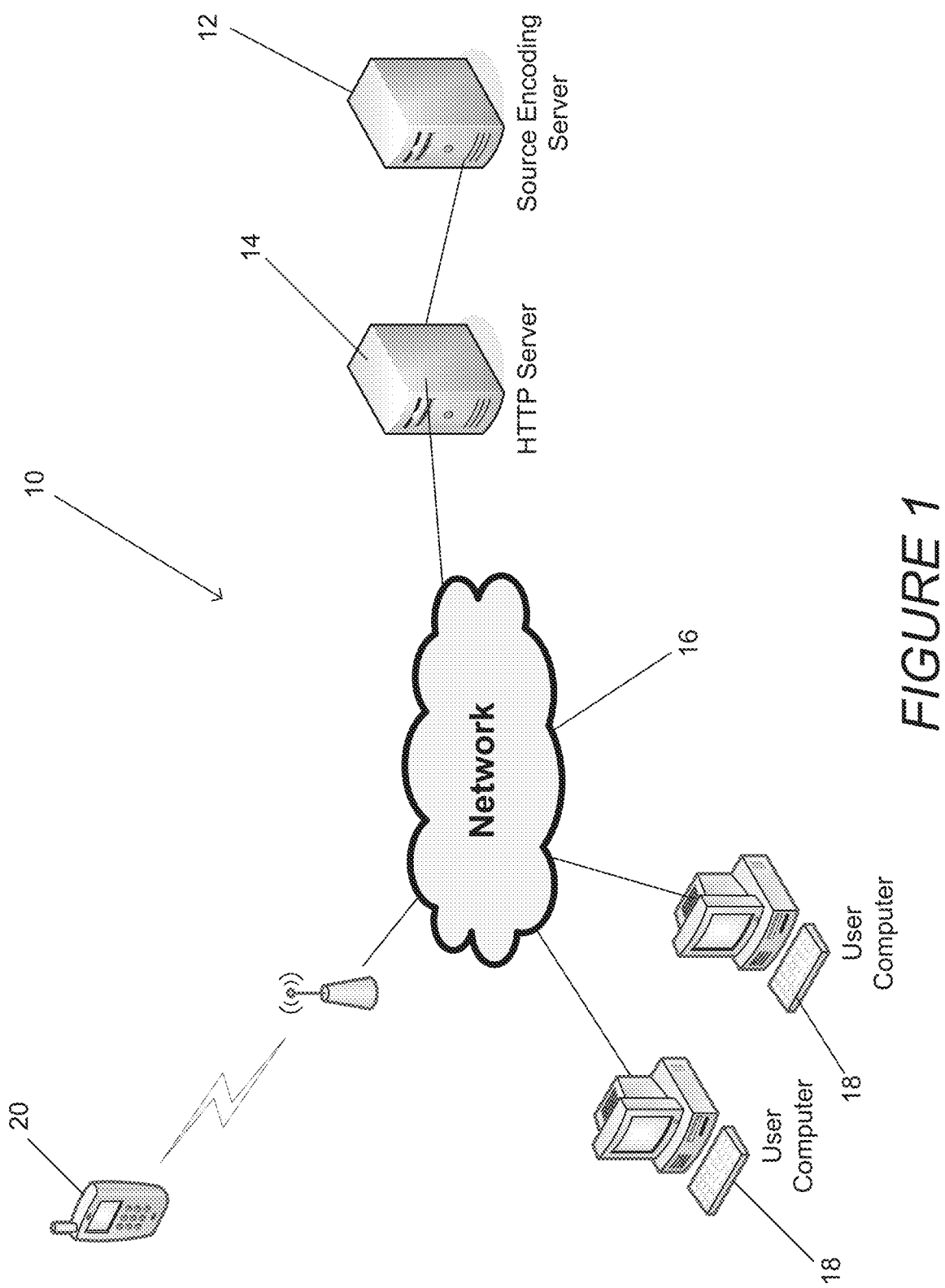
FIG. 1 illustrates a network diagram of an adaptive bitrate streaming system in accordance with an embodiment of the invention.

Turning now to the drawings, systems and methods for encoding video content into streams for adaptive bitrate steaming and obtaining the stream using a playback device in accordance with some embodiments of the invention are illustrated. In accordance with some embodiments of this invention, an encoding system includes more than one encoder. In accordance with some of these embodiments, the encoders maybe provided by software executed by a processing system in the encoding system. In accordance with many embodiments, the encoders may be provided by firmware in the encoding system. In accordance with a number of embodiments, the encoders are provided by hardware in the server system.

The encoding system receives a source stream of video content from a source that includes an embedded timestamp. In accordance with some embodiments, the video content is a live feed being recorded in real-time. In accordance with some of these embodiments, the source stream of video content includes a timestamp in accordance with universal time.

In accordance with some embodiments, each encoder is used to generate a single stream of a set of streams to be used for adaptive bitrate streaming of content. In accordance with some of these embodiments, all of the encoders begin receiving portions of the source stream of video content and are synchronized using the embedded timestamp within the received portions. As each encoder receives portions of the source stream of the video content from the source system, the encoders encode the received portions of the source stream of video content into segments of a stream having predefined parameters particular to each encoder. In accordance with some embodiments, the stream produced by each encoder has a different maximum bitrate (or different target average bitrate) than the streams being generated by the other encoders. In accordance with some other embodiments, other parameters including, but not limited to, aspect ratio, resolution, and frame rate may be varied in the stream being generated by the various encoders.

Each encoder stores the generated portions in one or more container files for the generated stream in accordance with some embodiments of the invention. The encoder also generates index or manifest information for each of the generated portions of the streams and adds the generated index or manifest information to an index file or manifest in accordance with many embodiments of the invention. The process is repeated until the end of the source stream is received.

In accordance with some other embodiments, the encoding system includes a number of encoders (N) and each encoder encodes a portion (e.g. 1/N) of the source stream multiple times using different sets of encoding parameters to create segments for each of the streams in an adaptation set of streams. In accordance with some of these embodiments, each encoder is assigned position in the processing order. Each encoder then begins to receive the source stream of the video content. As portions of the source stream are received by each of the encoders, the encoder determines whether a portion is an Nth segment of the source stream assigned to the encoder. If a portion is not an Nth segment, the encoder discards the segment. If a portion is an Nth segment, the encoder encodes the received portion into segments in accordance with each of the profiles for the various streams in the set of streams and stores the segments in the container files for the appropriate streams. The encoder then generates index or manifest information for each of the generated segments and adds the information to an appropriate index file or manifest. In accordance with many of these embodiments, the index or manifest information is added to a manifest for segments produced by the encoder. In accordance with some other embodiments, the index or manifest information for each segment produced for the various streams is added to the index file or manifest maintained for the specific stream and/or stored in a database in memory for future use in generating a manifest file. The process is repeated by each of the encoders until each of the encoders receive the end of the source stream.

In accordance with some embodiments, the media content is stored in streams in accordance with the DASH standards. However, one skilled in the art will recognize that the formats such as but not limited to, a Matroska (MKV) container file format may be used to store streams of the media content without departing from this invention.

The performance of an adaptive bitrate streaming system in accordance with some embodiments of the invention can be significantly enhanced by encoding each portion of the source video in each of the alternative streams in such a way that the segment of video is encoded in each stream as a single (or at least one) closed group of pictures (GOP) starting with an Instantaneous Decoder Refresh (IDR) frame, which is an intra frame. The playback device can switch between the alternative streams used during playback at the completion of the playback of a video segment and, irrespective of the stream from which a video segment is obtained, the first frame in the video segment will be an IDR frame that can be decoded without reference to any encoded media other than the encoded media contained within the video segment.

In a number of embodiments, the playback device obtains information concerning each of the available streams from the MPD and selects one or more streams to utilize in the playback of the media. The playback device can also request index information that indexes segments of the encoded video content stored within the relevant container files. The index information can be stored within the container files or separately from the container files in the MPD or in separate index files. The index information enables the playback device to request byte ranges corresponding to segments of the encoded video content within the container file containing specific portions of encoded video content via HTTP (or another appropriate stateful or stateless protocol) from the server. The playback device uses the index information to request segments of the video content from the alternative streams in accordance with some embodiments. Playback is continued with the playback device requesting segments of the encoded video content from a stream having video content that is encoded at a maximum bitrate that can supported by the network conditions.

In accordance with some embodiments of the invention, the playback device operates in the following manner to use the streams generated by the multiple encoders in the encoding system. The playback device requests the media content that includes the video content. In response to the request, the playback device receives the MPD or index file maintained and/or generated by each encoder. The playback devices uses embedded timestamps to then join the MPD or index files from the various encoders into a combined adaptation set of index information. The playback devices then uses the index information from the combined adaptation set to perform adaptive bitrate streaming to obtain the video content. In accordance with some other embodiments, the server generates a MPD from the MPD or index files generated by each encoder using the embedded time stamps and provides the MPD to the playback devices. The playback devices then uses MPD to perform adaptive bitrate streaming to obtain the video content.

The encoding of video content into multiple streams for use in adaptive bitrate streaming using multiple encoders and the process for obtaining the video content from the generated streams by a playback device using adaptive bitrate streaming in accordance with some embodiments of the invention is discussed further below.

Adaptive Streaming System Architecture

Turning now to the FIG. 1, an adaptive streaming system that includes an encoding system that generates streams using multiple encoders in accordance with an embodiment of the invention is illustrated. The adaptive streaming system 10 includes a source encoding system 12 configured to encode source media content including video content as a number of alternative streams. In the illustrated embodiment, the source encoder is a single server. In other embodiments, the source encoder can be any processing device or group of processing devices including a processor and sufficient resources to perform the transcoding of source media (including but not limited to video, audio, and/or subtitles) into the alternative streams. Typically, the source encoding server 12 generates an MPD that includes an index indicating container files containing the streams and/or metadata information, at least a plurality of which are alternative streams. Alternative streams are streams that encode the same media content in different ways. In many instances, alternative streams encode media content (such as, but not limited to, video content and/or audio content) at different maximum bitrates. In a number of embodiments, the alternative streams of video content are encoded with different resolutions and/or at different frame rates. However, the source encoder system 12 uses multiple encoders to generate the alternative streams and each particular encoder generates an MPD for the segments of the stream or streams generated by the particular encoder. The MPDs generated by the various encoders and the container files are uploaded to an HTTP server 14. A variety of playback devices can then use HTTP or another appropriate stateless protocol to request portions of the MPDs, index files, and the container files via a network 16 such as the Internet.

In the illustrated embodiment, playback devices that can perform adaptive bitrate streaming using the MPDs from the various encoders include personal computers 18, CE players, and mobile phones 20. In accordance with some other embodiments, playback devices can include consumer electronics devices such as DVD players, Blu-ray players, televisions, set top boxes, video game consoles, tablets, virtual reality headsets, augmented reality headsets and other devices that are capable of connecting to a server via a communication protocol including (but not limited to) HTTP and playing back encoded media. Although a specific architecture is shown in FIG. 1, any of a variety of architectures including systems that perform conventional streaming and not adaptive bitrate streaming can be utilized that enable playback devices to request portions of the MPDs and the container files in accordance with various embodiments of the invention.

Encoder System

Figure 2:
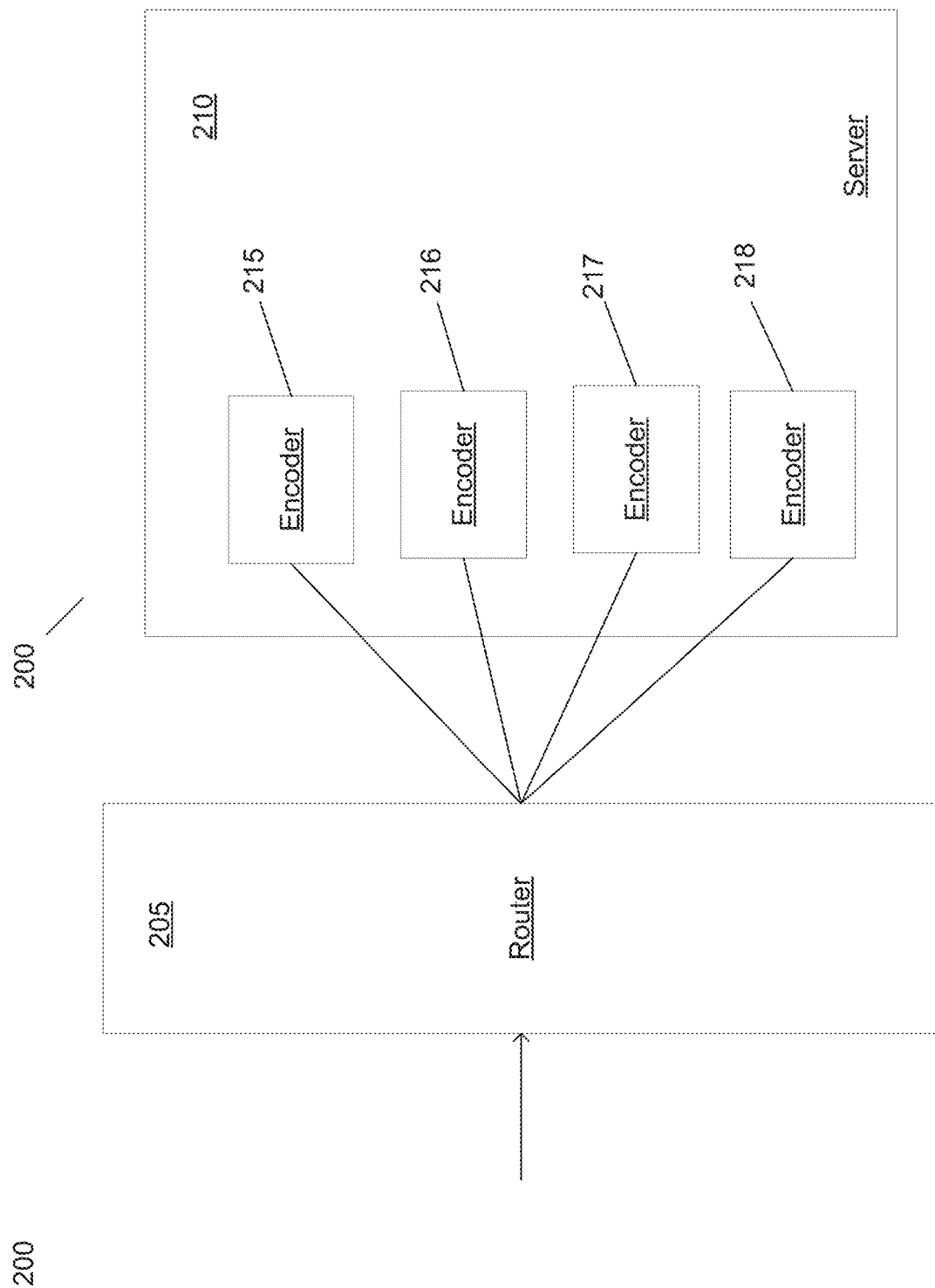
FIG. 2 illustrates a block diagram of components of an encoding server system in accordance with an embodiment of the invention.

An encoder system that uses multiple encoders to encode video content into alternative streams for use in adaptive bitrate streaming in accordance with an embodiment of the invention is shown in FIG. 2. Encoding system 200 includes a router 205 and an encoding server 202 communicatively connected to router 205. One skilled in the art will recognize that any number of servers or processors may be connected to router 205 without departing from this invention and that only one server is shown for clarity and brevity. The encoder includes multiple encoders 215-218. In accordance with some embodiments, each of the encoders 215-218 is an instantiation of software that is being executed by the processor from instructions stored in a memory to perform the decoding and/or encoding of the source content. In accordance with some other embodiments, one or more of encoders 215-218 is a particular hardware component in the server that encodes received content. In still other embodiments, one or more of the encoders may be a firmware component in which hardware and software are used to provide the encoder. The router provides an incoming source stream of video content to each of the encoders 215-218 of the server 210. In accordance with some embodiments, the router transmits a copy of the stream to each of the encoders. In accordance with some other embodiments, the server 210 receives the source stream and provides a copy of the incoming source stream to each of the encoders 215 as the source stream is received. The source stream includes embedded timing information.

Although a specific architecture of a server system is shown in FIG. 2, any of a variety of architectures including systems that encode video content from a received stream can be utilized in accordance with various embodiments of the invention.

Playback Device

Figure 3:
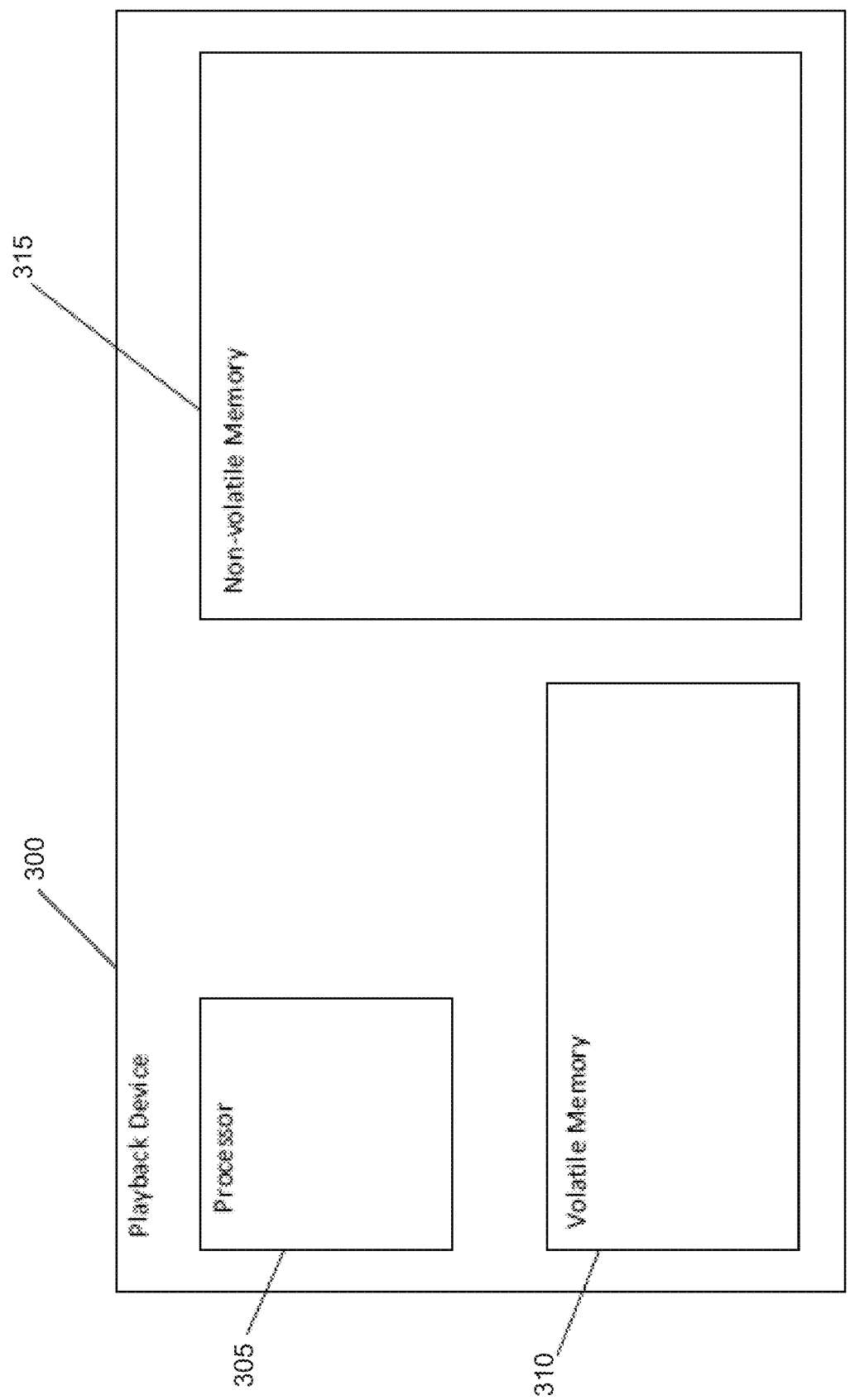
FIG. 3 illustrates a block diagram of components of a processing system in an encoder server system that encodes the video content into streams having different maximum bitrates in accordance with an embodiment of the invention.

Processes that provide the methods and systems for using the alternative streams generated by multiple encoders in accordance with some embodiments of this invention are executed by a playback device. The relevant components in a playback device that can perform the processes in accordance with an embodiment of the invention are shown in FIG. 3. One skilled in the art will recognize that playback devices may include other components that are omitted for brevity without departing from described embodiments of this invention. The playback device 300 includes a processor 305, a non-volatile memory 310, and a volatile memory 315. The processor 305 is a processor, microprocessor, controller, or a combination of processors, microprocessor, and/or controllers that performs instructions stored in the volatile memory 315 or non-volatile memory 310 to manipulate data stored in the memory. The non-volatile memory 310 can store the processor instructions utilized to configure the playback device 300 to perform processes including processes for using alternative streams encoded by multiple encoders to obtain video content using adaptive bit rate streaming in accordance with some embodiments of the invention. In accordance with various other embodiments, the playback device may have hardware and/or firmware that can include the instructions and/or perform these processes. In accordance with still other embodiments, the instructions for the processes can be stored in any of a variety of non-transitory computer readable media appropriate to a specific application.

Servers

Figure 4:
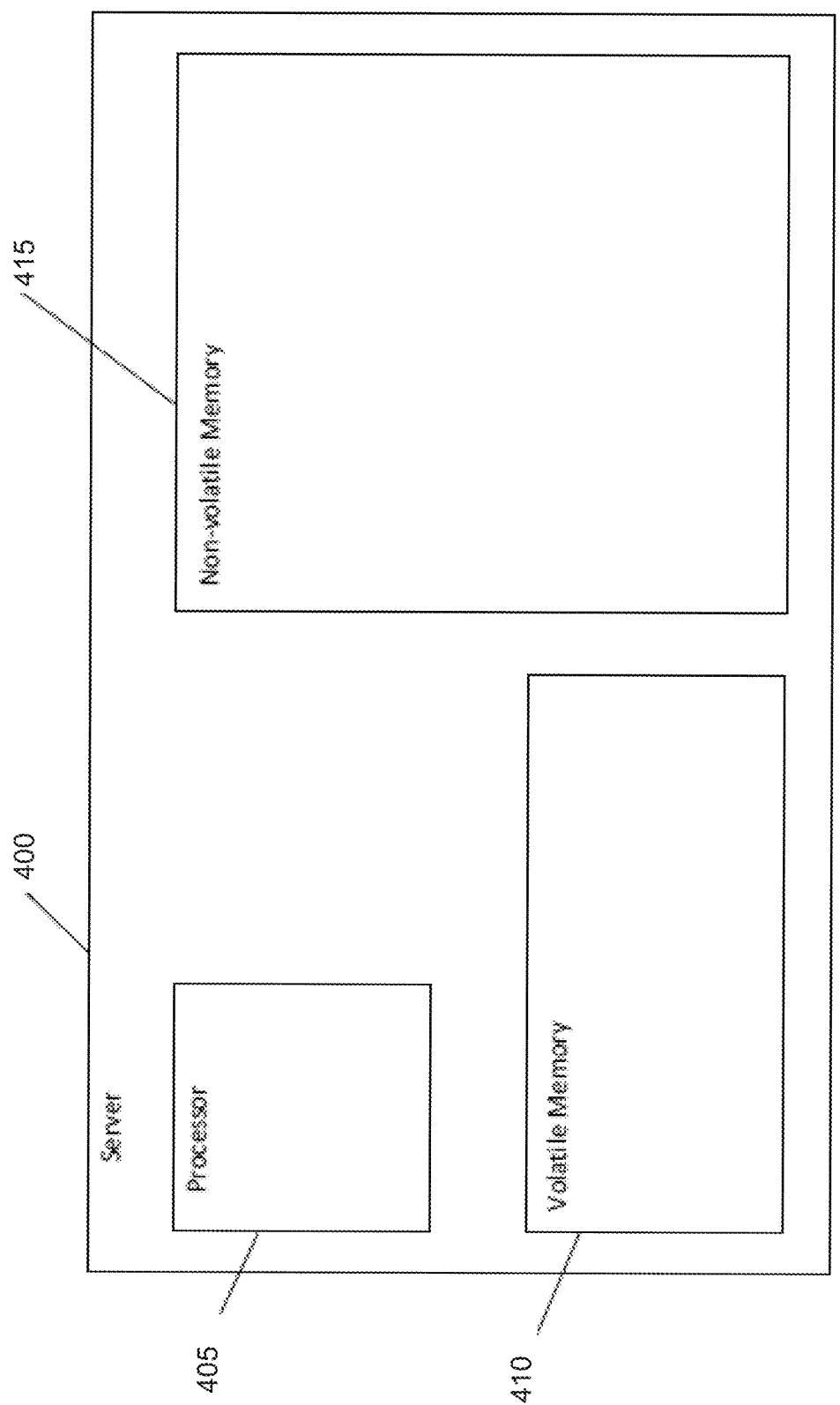
FIG. 4 illustrates a block diagram of components of a processing system in a playback device that uses the encoded streams having different maximum bitrates to obtain the video content via adaptive bitrate stream, encoding system in accordance with an embodiment of the invention.

Process in a method and system of encoding video content into streams for adaptive bitrate streaming using multiple encoders in accordance with an embodiment of this invention are performed by an encoder such as an encoding server. The relevant components in an encoding server that perform these processes in accordance with an embodiment of the invention are shown in FIG. 4. One skilled in the art will recognize that a server may include other components that are omitted for brevity without departing from the described embodiments of this invention. The server 400 includes a processor 405, a non-volatile memory 410, and a volatile memory 415. The processor 405 is a processor, microprocessor, controller, or a combination of processors, microprocessor, and/or controllers that performs instructions stored in the volatile 415 or non-volatile memory 410 to manipulate data stored in the memory. The non-volatile memory 410 can store the processor instructions utilized to configure the server 400 to perform processes including processes for encoding media content and/or generating marker information in accordance with some embodiments of the invention and/or data for the processes being utilized. In accordance with various embodiments, these instructions may be in server software and/or firmware can be stored in any of a variety of non-transitory computer readable media appropriate to a specific application. Although a specific server is illustrated in FIG. 4, any of a variety of servers configured to perform any number of processes can be utilized in accordance with various embodiments of the invention.

Encoding of Video Content into Alternative Streams for Adaptive Bitrate Streaming Using Multiple Encoders in an Encoding System In accordance with some embodiments, an encoding system encodes video content into alternative streams for adaptive bitrate streaming using multiple encoders. In accordance with some embodiments of the invention, the encoders are software encoders that are instantiations of software instructions read from a memory that can be performed or executed by a processor. Software encoders may be used when it is desirable to reduce the cost of the encoders and/or to improve the scalability of the system as only processing and memory resources are needed to add additional encoders to the system. In accordance with many embodiments, one or more of the multiple encoders are hardware encoders. Hardware encoders are circuitry that is configured to perform the processes for encoding the received content into one or more streams. In accordance with a number of embodiments, one or more of the encoders may be firmware encoders. A firmware encoder combines some hardware components and some software processes to provide an encoder.

The video content may be received as a source stream from a content provider. In accordance with some embodiments, the video content is a live broadcast meaning the video content is being captured and streamed in real time. The video content may include time information. The time information may include, but is not limited to, a broadcast time, a presentation time and/or a time recorded. Each of the encoders receives the source stream of video content and generates portions of the alternative streams. In accordance with some embodiments, each of the multiple encoders produces a single stream having encoder specific parameters from the source stream. In accordance with some other embodiments, the encoding system includes a number of encoders (N) and each encoder encodes a portion (e.g. 1/N) of the source stream multiple times using different sets of encoding parameters to create segments for each of the streams in an adaptation set of streams. Processes for encoding alternative streams of video content from a source stream of video content using multiple encoders in accordance with some different embodiments of the invention are shown in FIGS. 5 and 6.

Figure 5:
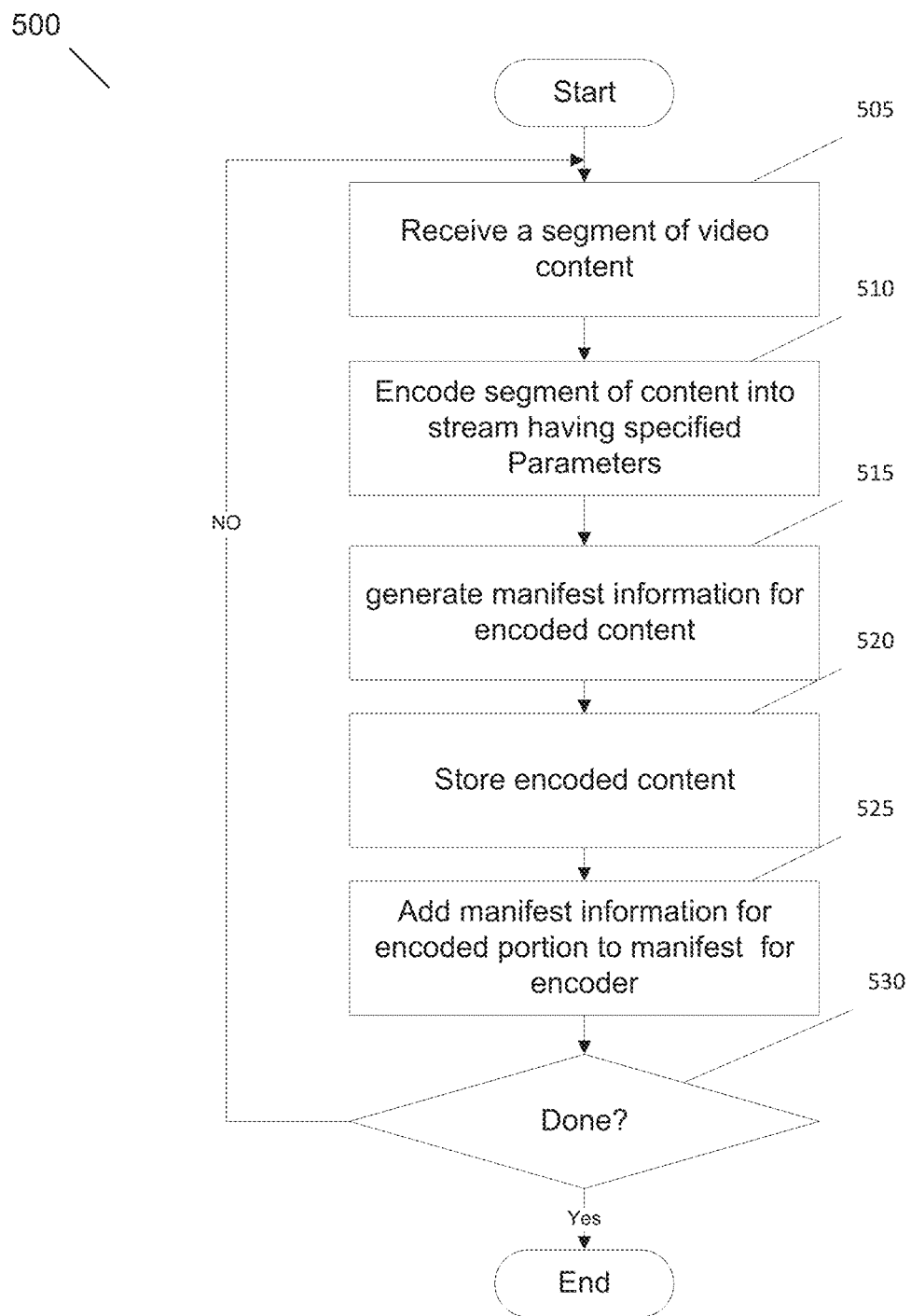
FIG. 5 illustrates a flow diagram for a process performed by each encoder in an encoder server system to encode video content into one of the streams used in an adaptive bitrate streaming system in accordance with an embodiment of the invention.
Figure 6:
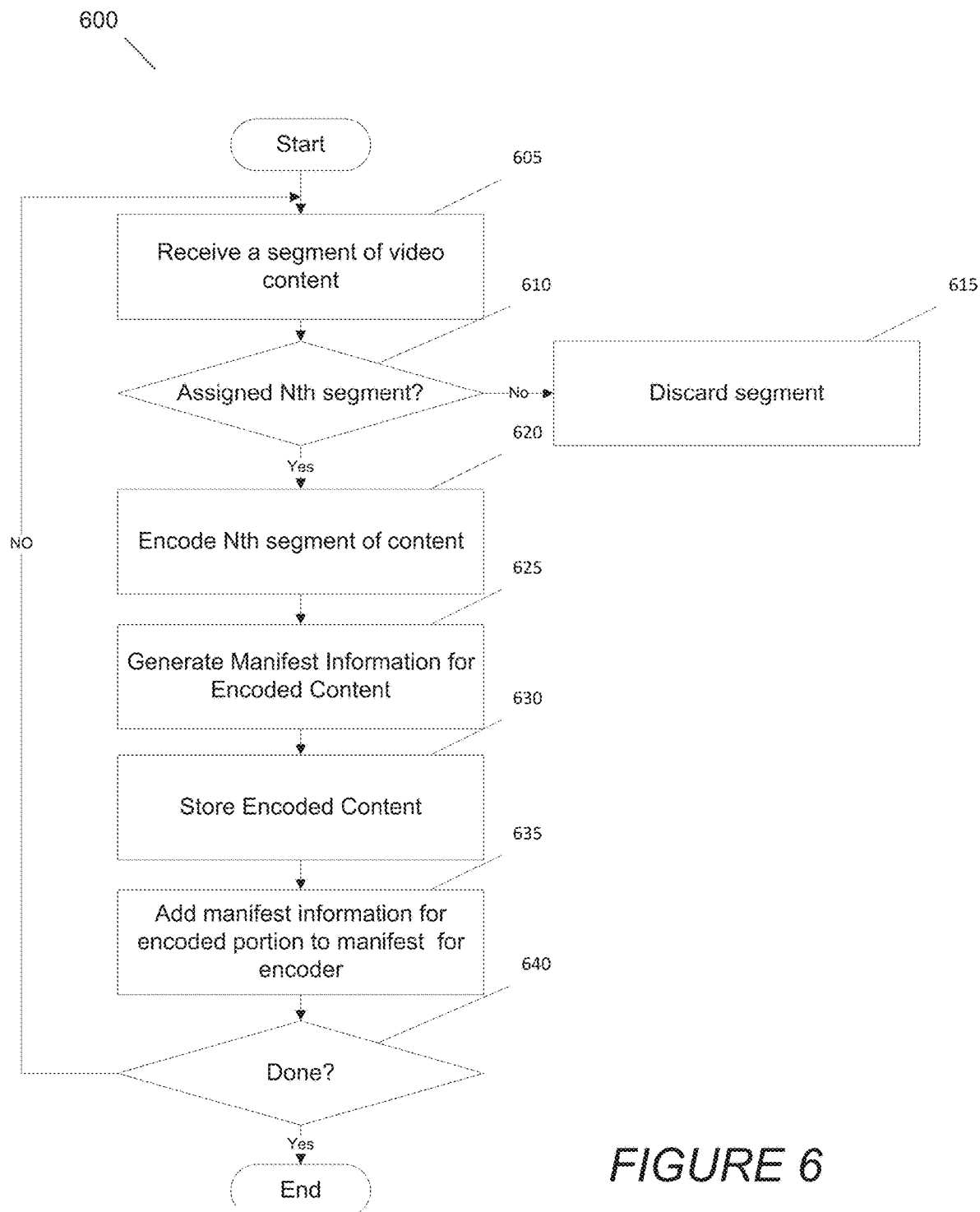
FIG. 6 illustrates a flow diagram for a process performed by each of N encoders in an encoder server system to encode each Nth segment of the video content in accordance with an embodiment of the invention.

A flow chart of a process performed by at least one of a set of multiple encoders to generate a single stream of the alternative streams from the source stream of video content in accordance with an embodiment of the invention is shown in FIG. 5. In process 500, the encoder receives a portion of a source stream of video content that includes timing information (505). In accordance with some embodiments, the encoders may use time information received with the portion to determine at what point in the stream the encoder is to start encoding the stream. As the encoders are using the same timing information, the encoding performed by the encoders is synchronized such that the segments produced by each encoder include the same duration of video content to present in terms of presentation time and the segments are aligned. The encoder uses the portion of the source stream of video content to encode a segment of a stream of video content that has specified parameters particular to the encoder (510). In accordance with some embodiments, the specified parameters of the stream generated by each encoder include a different maximum bitrate.

In accordance with some other embodiments, the streams from two or more encoders have the same maximum bitrate and different aspect ratios, resolutions, and/or frame rates. The encoder also generates index or manifest information for the generated segment (515). The generated segment is stored in the container of the stream being generated by the encoder (520) and the index or manifest information is added to the manifest or index file for the stream stored in memory and/or delivered to client playback devices as an update (525). Process 500 repeats until the encoder receives the end of the stream and/or reception of the stream is halted in some other manner (530).

Although various examples of processes performed by an encoder for encoding one of a set alternative streams of video content are described above, one skilled in the art will recognize that other processes for encoding the streams may be performed in accordance with some embodiments of the invention.

In accordance with some other embodiments of the invention, the encoding system includes a number of encoders (N) and each encoder encodes a portion (e.g. 1/N) of the source stream multiple times using different sets of encoding parameters to create segments for each of the streams in an adaptation set of streams. Each encoder is assigned an encoder order position M where M is a number between 1 and M. The first encoder encodes the first portion of the source stream and every Nth portion received thereafter into segments of each of the alternative streams. The second encoder handles the second received portion of the source stream and every Nth portion received thereafter into segments of each of the alternative streams. Likewise, the remaining encoders in the encoding order 1 through N encode the Mth received portion of the every Nth portion received thereafter into segments of the various alternative streams where M is the encoding order position. Thus, each encoder only encodes 1/N of the total number of segments of the source streams into alternative streams. This type of encoding causes the availability of segments to be N*|segment duration| and not real time. Thus, the availability time of the segments may need to be added to information in the manifest to allow clients to know when the segments will be available. A flow diagram of a process performed by each of the N encoders to generate every Nth segment of the video content from the source stream in accordance with an embodiment of the invention is shown in FIG. 6.

In process 600, the encoder receives a portion of a source stream of video content that includes timing information (605). In accordance with some embodiments, the encoders may use time information received with the portion to determine at what point in the stream the encoder is to start encoding the stream. As the encoders are using the same timing information from the source stream, the encoding performed by the encoders is synchronized such that the segments produced by each encoder include the same amount of video content to present in terms of presentation time and the segments are aligned with subsequent segments.

The encoder then determines whether the received portion is one of the Nth portions of the source stream to handle (610). The determination may be performed by using a counter to count the received portions and compare the current count to M and determine whether the count is equal to or a factor of M where M is the encoder position order in accordance with some embodiments. In accordance with some other embodiments, metadata for the received portions of the source streams are used to make the determination.

If the received portion is not one of the portions the encoder is to handle, the encoder discards the received portion of the stream (615). If the received portion is determined to be one of the portions of the incoming streams the encoder is to encode, the encoder encodes the portion in segments for each of the alternative streams based upon the specific parameters for each of the alternative streams (620). The parameters of the streams include, but are not limited to, maximum bitrates, resolution, aspect ratio, and frame rate.

The encoder also generates index or manifest information for each of the generated segments (625). This includes generating manifest information for each of the alternative streams. Each of the generated segments is stored in the container(s) of the appropriate alternative stream (630) and the index or manifest information is added to an appropriate manifest or index file(s) (635). In accordance with some embodiments, manifest or index information is added to the MPD for the alternative streams stored in memory. In accordance with some other embodiments, the manifest or index information is added to an MPD for the segments encoded by the encoder. In still other embodiments, the manifest or index information is delivered to client playback devices as an update. Process 600 repeats until the encoder receives the end of the stream and/or reception of the stream is halted in some other manner (640).

Although various examples of processes performed by an encoder for encoding every Nth segment for each of the alternative streams of video content are described above, one skilled in the art will recognize that other processes for encoding the portions for the streams may be performed in accordance with some embodiments of the invention.

Process Performed by a Playback Device to Obtain Video Content Using Alternative Streams Generated by Multiple Encoders In accordance with some embodiments of the invention, a playback device uses the streams generated by the multiple encoders to obtain the video content for playback. In accordance with some embodiments of the invention, the playback devices adaptive bit rate streaming to obtain the media content from the alternative streams generated using multiple encoders. To do so, the playback device must receive the MPD generated by each of the encoders to generate a combined adaptation set for use in obtaining the segments using adaptive bit rate streaming. In accordance with some embodiments, the combined adaptation set is generated based upon timestamps embedded in the MPD generated by each of the encoders. A process performed by a playback device to perform adaptive bitrate streaming in accordance with an embodiment of the invention is shown in FIG. 7.

In process 700, the playback device requests the index or manifest information for the video content (705). The playback device receives the MPD or index files generated by each encoders as the encoders generate the segments of the alternative streams (710). The playback device generates a combined adaptive set from the index or manifest information in the MPDs from the encoders using the embedded time stamps in each of the MPDs (715). In accordance with some embodiments, the combined adaptive set generated has the same format as a MPD and is generated by populating the combine adaptive set with the index or manifest information from the received MPD. The combined adaptive set is used by the playback device to perform adaptive bit rate streaming to obtain the video content for playback (720). In accordance with some embodiments, the playback device uses the combined adaptive set to request portions of the video content. In accordance with some embodiments of the invention, the playback device monitors the network bandwidth for communications over the network between the playback device and the content provider system; and selects streams of the audio and/or video content that are encoded at highest maximum bitrates that can be handled in accordance with the measured bandwidth. Systems and methods for selecting a stream and commencing playback include those disclosed in U.S. Patent Application Publication 2013/0007200 entitled "Systems and Methods for Determining Available Bandwidth and Performing Initial Stream Selection When Commencing Streaming Using Hypertext Transfer Protocol" and U.S. Pat. No. 8,832,297 entitled "Systems and Methods for Performing Multiphase Adaptive Bitrate Streaming," the disclosures of which are hereby incorporated by reference in their entirety. More particularly, the processes performed by a playback device to obtain the video content using adaptive bit rate streaming described in these references are incorporated herein by reference.

Figure 7:
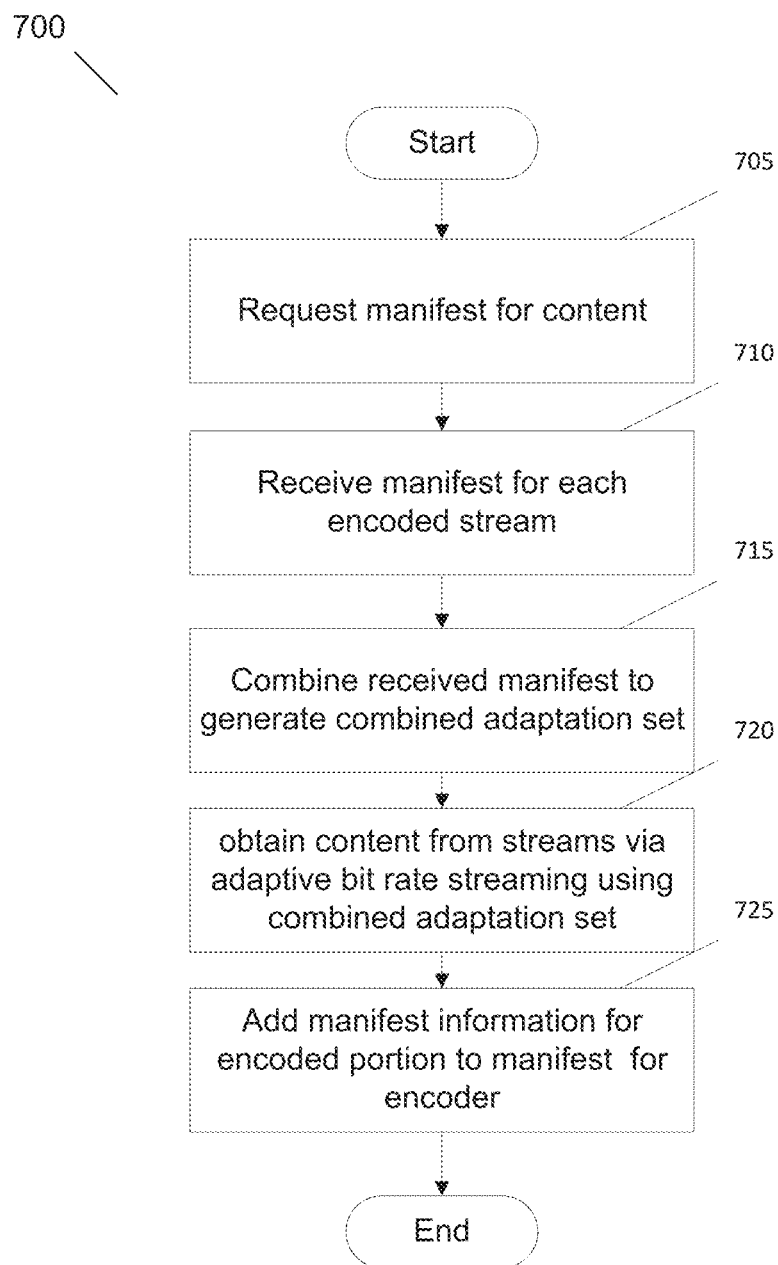
FIG. 7 illustrates a flow diagram of a process performed by a playback device to obtain the manifest information for the streams and use the streams to obtain the video content using an adaptive bitrate system in accordance with an embodiment of the invention.

Although a process performed by a playback device to obtain video content performing adaptive bit rate streaming using the alternative streams generated by multiple encoders in accordance with an embodiment of the invention is disclosed in FIG. 7, other processes may be performed by a playback device to obtain video content using alternative streams generated by multiple encoders in accordance with embodiments of the invention.

Although the present invention has been described in certain specific aspects, many additional modifications and variations would be apparent to those skilled in the art. Specifically, this invention may be used in association with trick play tracks where only certain frames of the trick-play track are shown in accordance with some embodiments of the invention. It is therefore to be understood that the present invention may be practiced otherwise than specifically described, including various changes in the implementation such as utilizing encoders and decoders that support features beyond those specified within a particular standard with which they comply, without departing from the scope and spirit of the present invention. Thus, embodiments of the present invention should be considered in all respects as illustrative and not restrictive.

What is claimed:

1. A method of encoding a plurality of alternative streams of video content from a source stream of video content using a plurality of encoders in an encoding system, the method comprising:
   receiving a plurality of portions of the source stream of video content;
   instantiating the plurality of encoders; and
   encoding the plurality of portions of the source stream of video content such that each portion of the source stream is encoded by one of the plurality of encoders, wherein different portions of the source stream are encoded by different encoders of the plurality of encoders;
   storing the different portions of the source stream in a container for the encoded stream;
   generating index information for the encoded stream; and
   storing the index information for the encoded stream in the container for the encoded stream.

2. The method of claim 1, wherein the encoded stream comprises a particular set of parameters.

3. The method of claim 2, wherein the particular set of parameters comprises a particular maximum bitrate.

4. The method of claim 2, wherein the particular set of parameters comprises at least one selected from the group consisting of aspect ratio, frame rate, and resolution.

5. The method of claim 1, further comprising causing the encoder encoding each of the portions to encode multiple times to create a plurality of alternative encoded streams each having a different set of parameters.

6. The method of claim 5, wherein at least two alternative encoded streams have a same maximum bitrate and at least one other parameter that is different.

7. The method of claim 5, further comprising generating index information for each of the plurality of alternative encoded streams.

8. The method of claim 1, wherein the index information is stored in a manifest.

9. The method of claim 8, wherein the manifest further includes information indicating when at least one of the encoded portions is available for streaming.

10. An encoding system for encoding a source stream of video content comprising:
    at least one processor;
    memory accessible by the at least one processor; and
    instructions stored in the memory that when read by the at least one processor direct the processor to:
      receive a plurality of portions of the source stream of video content;
      instantiate the plurality of encoders; and
      encode the plurality of portions of the source stream of video content such that each portion of the source stream is encoded by one of the plurality of encoders, wherein different portions of the source stream are encoded by different encoders of the plurality of encoders;
store the different portions of the source stream in a container for the encoded stream;
generate index information for the encoded stream; and
store the index information for the encoded stream in the container for the encoded stream.

11. The system of claim 10, wherein the encoded stream comprises a particular set of parameters.

12. The system of claim 11, wherein the particular set of parameters comprises a particular maximum bitrate.

13. The system of claim 11, wherein the particular set of parameters comprises at least one selected from the group consisting of aspect ratio, frame rate, and resolution.

14. The system of claim 10, wherein the instructions further direct the processor to cause the encoder encoding each of the portions to encode multiple times to create a plurality of alternative encoded streams each having a different set of parameters.

15. The system of claim 14, wherein at least two alternative encoded streams have a same maximum bitrate and at least one other parameter that is different.

16. The system of claim 14, wherein the instructions further direct the processor to generate index information for each of the plurality of alternative encoded streams.

17. The system of claim 10, wherein the index information is stored in a manifest.

18. The system of claim 17, wherein the manifest further includes information indicating when at least one of the encoded portions is available for streaming.

* * * * *

UNITED STATES PATENT AND TRADEMARK OFFICE
CERTIFICATE OF CORRECTION

PATENT NO. : 11,483,609 B2
APPLICATION NO. : 17/343453
DATED : October 25, 2022
INVENTOR(S) : William David Amidei, Abhishek Shivadas and Kevin Dean-Yong Wu It is certified that error appears in the above-identified patent and that said Letters Patent is hereby corrected as shown below:

In the Claims

Column 12: (Claim 1, Line 22) delete "and"; (Claim 10, Line 64) delete "and".

Signed and Sealed this
Thirteenth Day of December, 2022

Katherine Kelly Vidal
*Director of the United States Patent and Trademark Office*